United States Patent [19]
Haneda

[11] Patent Number: 6,005,679
[45] Date of Patent: *Dec. 21, 1999

[54] IMAGE DATA FILING SYSTEM FOR QUICKLY RETRIEVING AN AREA OF INTEREST OF AN IMAGE FROM A REDUCED AMOUNT OF IMAGE DATA

[75] Inventor: Norihisa Haneda, Asaka, Japan

[73] Assignee: Fuji Photo Film Co., Ltd., Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/517,354

[22] Filed: Aug. 21, 1995

[30] Foreign Application Priority Data

| Aug. 22, 1994 | [JP] | Japan | 6-196500 |
| Aug. 24, 1994 | [JP] | Japan | 6-199177 |
| Aug. 24, 1994 | [JP] | Japan | 6-199178 |

[51] Int. Cl.⁶ .................................................. G06F 17/30
[52] U.S. Cl. ............................................. 358/453; 345/202
[58] Field of Search .................................. 348/231, 232; 358/403, 450, 451, 453, 452; 382/305; 386/125, 95; 345/202

[56] References Cited

U.S. PATENT DOCUMENTS

| 4,992,887 | 2/1991 | Aragaki | 358/403 |
| 5,029,228 | 7/1991 | Nonoyama et al. | 382/305 |
| 5,129,011 | 7/1992 | Nishikawa et al. | 382/173 |
| 5,165,103 | 11/1992 | Takeda et al. | 382/305 |
| 5,206,931 | 4/1993 | Kimura et al. | 345/129 |
| 5,224,181 | 6/1993 | Tsutsumi | 358/452 |
| 5,553,277 | 9/1996 | Hirano et al. | 358/403 |
| 5,576,759 | 11/1996 | Kawamura et al. | 348/231 |
| 5,748,234 | 5/1998 | Lippincott | 348/222 |

FOREIGN PATENT DOCUMENTS 5-181905  7/1993  Japan .

*Primary Examiner*—Eddie P. Chan
*Assistant Examiner*—Gary J. Portka

[57] ABSTRACT

A system for arranging image data in a file which is capable of quickly taking out only a part of an image recorded in the file from a reduced amount of image data. The filing system has an image signal input unit for receiving an image signal representative of a frame of image, a block receiving identification generating unit for dividing a field of image area formed by the image signal into blocks and for generating identifications each assigned to associated one of those blocks, and a storage unit having a first area adapted to store image signals of the blocks. The storage unit has a second area adapted to store an identification of desired one of the blocks.

34 Claims, 32 Drawing Sheets

Fig. 15

| REDUCED-IMAGE FILE | | BYTES |
|---|---|---|
| 1450 — HEADER | | 512 |
| 1500 — ENTRY FIELD | | 256<br><br>256 |
| 1600 — DATA | | 10,240<br><br>10,240 |
| 1750 — (SPARE) | | 10,240 |

Fig. 18

| 1418 | 7 | 6 | 5 | 4 | 3 | 2 | 1 | 0 |
|---|---|---|---|---|---|---|---|---|
| 00 | OPTIONAL | DESCRIPTION | | | H | N | H | H |

Fig. 16

| | HEADER | BYTES | CONTENTS |
|---|---|---|---|
| 1402 — 0 ~ 5 | ID NUMBER | 6 | CHARACTER CODE |
| 1404 — 6 ~ 7 | VERSION NO. | 2 | B C D |
| 1406 — 8 ~ 13 | IMAGE CLASSIFICATION | 6 | — |
| 1408 — 14 ~ 17 | TIME AND DATA OF MAKING FILE | 4 | TIME STAMP |
| 1410 — 18 ~ 21 | TIME AND DATA OF UPDATING FILE | 4 | TIME STAMP |
| 1412 — 22 ~ 23 | NUMBER OF DATA | 2 | UNIT 16 |
| 1414 — 24 ~ 55 | FILE NAME | 32 | CHARACTER CODE |
| 1416 — 56 ~ 511 | SPARE BYTES | 456 | S O O |

Fig. 17

| IMAGE CLASSIFICATION | | BYTES | CONTENTS |
|---|---|---|---|
| 0 | OPTIONAL DESCRIPTION | 1 | CHARACTER CODE |
| 1 | SPARE BYTE | 1 | S O O |
| 2 ~ 5 | OFFSET POINTER | 4 | UNIT 32 |

1418 — OPTIONAL DESCRIPTION
1420 — SPARE BYTE
1422 — OFFSET POINTER

Fig. 19

| | REDUCED-DATA ENTRY | BYTES | CONTENTS |
|---|---|---|---|
| 1502 ⟩ 0 ~ 3 | DATA FILE ID NO. | 4 | UNIT 32 |
| 1504 ⟩ 4 ~ 14 | ALBUM NAME | 11 | CHARACTER CODE |
| 1506 ⟩ 15 ~ 25 | DATA FILE NAME | 11 | CHARACTER CODE |
| 1508 ⟩ 26 ~ 29 | OFFSET POINTER | 4 | UNIT 32 |
| 1510 ⟩ 30 ~ 159 | INFORMATION FORMED | 130 | — |
| 1512 ⟩ 160 ~ 191 | DATA NAME | 32 | CHARACTER CODE |
| 1514 ⟩ 192 ~ 255 | SPARE BYTES | 64 | S 00 |

Fig. 20

| | | INFORMATION FORMED | BYTES | CONTENTS |
|---|---|---|---|---|
| 1520 | 0 ~ 1 | NO. OF THE STANDARD | 2 | B C D |
| 1522 | 2 ~ 2 | IMAGE FORMING SCHEME | 1 | UNIT 8 |
| 1524 | 3 ~ 3 | DIRECTION OF IMAGE | 1 | UNIT 8 |
| 1526 | 4 ~ 11 | CONTENTS FORMED | 8 | — |
| 1528 | 12 ~ 31 | SOFTWARE NAME | 20 | CHARACTER CODE |
| 1530 | 32 ~ 61 | INPUT DEVICE MODEL | 30 | CHARACTER CODE |
| 1532 | 62 ~ 81 | INPUT DEVICE TYPE | 20 | CHARACTER CODE |
| 1534 | 82 ~ 111 | COPYRIGHT | 30 | CHARACTER CODE |
| 1536 | 112 ~ 115 | TIME AND DATE OF MAKING IMAGE | 4 | TIME STAMP |
| 1538 | 116 ~ 119 | TIME AND DATE OF MAKING FILE | 4 | TIME STAMP |
| 1540 | 120 ~ 123 | TIME AND DATE OF UPDATING FILE | 4 | TIME STAMP |
| 1542 | 124 ~ 124 | PROTECTED OR NOT | 1 | UNIT 8 |
| 1544 | 125 ~ 129 | SPARE BYTES | 5 | S O O |

Fig. 21

| | |
|---|---|
| 1602 | ALBUM HEADER |
| 1604 | ALBUM ATTRIBUTE |
| 1606 | ALBUM NO. |
| 1608 | NUMBER OF ALBUMS |
| 1610 | ALBUM NAME |
| 1612 | TIME AND DATE OF MAKING ALBUM |
| 1614 | TIME AND DATE OF UPDATING ALBUM |
| 1616 | NUMBER OF "A" FILES |
| | NUMBER OF "B" FILES |
| | ⋮ |
| | NUMBER OF "XX" FILES |
| 1618 | PATH TO PATH IMAGE |
| 1620 | PATH TO "A" FILE #1 |
| | PATH TO "A" FILE #2 |
| | ⋮ |
| | PATH TO "A" FILE #nn |
| | PATH TO "B" FILE #1 |
| | PATH TO "B" FILE #2 |
| | ⋮ |
| | PATH TO "B" FILE #nn |
| | ⋮ |
| | PATH TO "X" FILE #1 |
| | PATH TO "X" FILE #2 |
| | ⋮ |
| | PATH TO "X" FILE #nn |

Fig. 24

```
| ALBUM HEADER
| ALBUM ATTRIBUTE
| ALBUM NO.
| ALBUM NAME
| TIME AND DATE OF MAKING ALBUM
| TIME AND DATE OF UPDATING ALBUM
|
| NUMBER OF SUB-ALBUMS INCLUDED IN ALBUM
| NUMBER OF DATA
| PATH TO ALBUM IMAGE
| SUB-ALBUM ENTRY #1
| SUB-ALBUM ENTRY #2
|     :
| SUB-ALBUM ENTRY #nn
```

Fig. 25

```
| ALBUM HEADER
| ALBUM ATTRIBUTE
| ALBUM NO.
| ALBUM NAME
| TIME AND DATE OF MAKING ALBUM
| TIME AND DATE OF UPDATING ALBUM
|
| NUMBER OF DATA
| PATH TO ALBUM IMAGE
| PATH TO DATA #1
| PATH TO DATA #2
|     :
| PATH TO DATA #nn
```

Fig. 33
CLASS 1: BASKETBALL    CLASS 5: MOTOCROSS 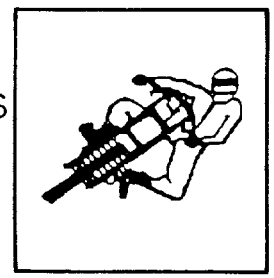
CLASS 2: SOCCER 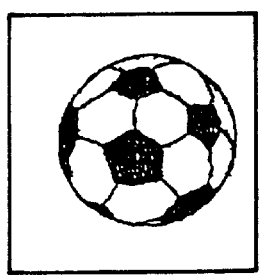   CLASS 6: BASEBALL 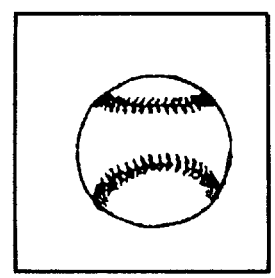
CLASS 3: BADMINTON 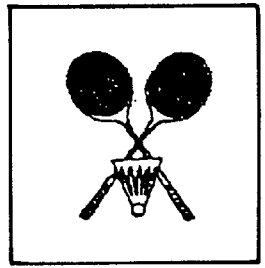   CLASS 7: GOLF 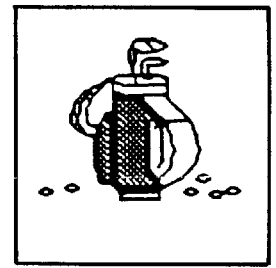
CLASS 4: KARATE    CLASS 8: ATHLETICS 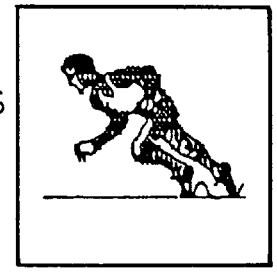

Fig. 35

| | |
|---|---|
| 2702 | ALBUM HEADER |
| 2704 | ALBUM ATTRIBUTE |
| 2706 | ALBUM NO. |
| 2708 | ALBUM NAME |
| 2710 | DATE OF MAKING FILE |
| 2712 | DATE OF UPDATING FILE |
| 2714 | NUMBER OF ALBUMS |
| 2716 | NUMBER OF IMAGES |
| 2718 | PATH TO PATH IMAGE |
| 2720 | PATH TO IMAGE #1 |
| | PATH TO IMAGE #2 |
| | ⋮ |
| | PATH TO IMAGE #nn |

Fig. 37

```
==================================================
| ALBUM HEADER
|-------------------------------------------------
| ALBUM ATTRIBUTE
|-------------------------------------------------
| ALBUM NO.
|-------------------------------------------------
| ALBUM NAME
|-------------------------------------------------
| DATE OF MAKING FILE
|-------------------------------------------------
| DATE OF UPDATING FILE
|-------------------------------------------------
| NUMBER OF ALBUMS
|-------------------------------------------------
| NUMBER OF IMAGES
|-------------------------------------------------
| PATH TO ALBUM IMAGE
|-------------------------------------------------
| REDUCED-IMAGE ENTRY #1
|-------------------------------------------------
| REDUCED-IMAGE ENTRY #2
|-------------------------------------------------
| :
|-------------------------------------------------
| REDUCED-IMAGE #MAX
|-------------------------------------------------
| REDUCED-IMAGE DATA #1
|-------------------------------------------------
| REDUCED-IMAGE DATA #2
|-------------------------------------------------
| :
|-------------------------------------------------
| REDUCED-IMAGE DATA #last
==================================================
```

IMAGE DATA FILING SYSTEM FOR QUICKLY RETRIEVING AN AREA OF INTEREST OF AN IMAGE FROM A REDUCED AMOUNT OF IMAGE DATA

BACKGROUND OF THE INVENTION

1. Field of the Invention

The present invention relates to a data filing system, and more particularly to a system for storing, retrieving and reproducing image data.

2. Description of the Background Art

In the case of photographs for use in engineering, such as images of a waveform displayed on the screen of an oscilloscope, an area of interest to be observed by an engineer is not always the whole area but often part of the screen. This is also the case with images recorded by measuring instruments, such as a spectrum analyzer, and further with an image data file in which images are recorded and analyzed in the form of digital data. Specifically, even when it is sufficient that only a part of interest of an image is reproduced, the entire area of the image frame is read out from the image data file. Also in the case of a composite picture or montage photograph, a photographic certificate or the like, what is actually required may frequently be only a portion of the area of an image frame, for example, a face portion of a person. Even in such a case, the data of the entire area of the image is read out and then an area of interest of the entire image is enlarged and taken out from the data.

Image data itself in principle has a high level of redundancy. Consequently, an image data file in which images are recorded on a digital data basis is large in size, since it involves a large amount of data. Thus, according to a system which requires the whole picture area of an image to be read out even where it is sufficient to retrieve data of only a portion of interest of the recorded image, it takes a lot of time for reproducing and retrieval. Specifically, a memory device which is slow in retrieval and transfer rate takes a remarkably long time for retrieval. With respect to the compsite photograph and the photographic certificate, there is adopted, to take out a part of interest of an image, a system which performs clipping such that data of the entire area of an image is read out and then a portion of interest of the image, such as of the face portion of a person, is enlarged. Thus, this also involves such a drawback that it takes a lot of time for retrieval.

Further, hitherto, in the case where still images such as still pictures or photographs are managed, for example, at home or the like, photographs each having a predetermined size are stored in a book-style album in such a manner that a plurality of pictures are sequentially pasted on pages of the album. In this case, it is possible to watch a plurality of images and also to easily locate a desired image by turning over sequentially the pages of the album. Further, it is possible to sort the related images on an album-by-album basis and also to easily locate an album including a desired image with associated indexes appended to the respective albums. However, the increased number of pictures involves an increased number of album volumes. Specifically, the increased number of album volumes, such as 10, 20 volumes, will cause such problems that a large space for storage is needed and the management is not easy. Further, safekeeping of those albums for years will bring about discoloration of the pictures, and will involve such a problem that pictures may inadvertently be broken when the pictures are repasted for rearrangement.

In view of the foregoing, recently, there has been developed an image recording system in which a still image such as a still picture is read by an image reader such as an image scanner and is converted into digital data, the data are each generated in the form of a data file which is able to be displayed on a display unit, and the data files are recorded on a large capacity optical disc such as a compact disc (CD). In this case, for example, an image file of the image data thus read is recorded on an optical recording medium together with data of key words, such as a file name, a photographer, a photographing date and the title of the image. Thus, when reproducing a desired image, entry of the key words such as a file name, a title or the like permits the image file of interest to be retrieved. When the entered key words, such as a photographer and a photographic date, are directed to a plurality of image files, these key words are first entered to retrieve an associated plurality of image files, and then an additional key word different from the earlier entered key word is entered to narrow the objects to be hit. This work is repeatedly carried out to locate the image of interest.

Further, for example, in Japanese Patent Laid-Open Publication No. 181905/1993, there is proposed a retrieval information display system in which pictures photographed by a digital still camera or the like are recorded in a memory card, from which a desired photographic picture is retrieved. That system is provided with a multi-screen, which includes a plurality of sections of a full screen corresponding to a plurality of pictures, to display a plurality of small pictures on the respective screen sections, on one of which displayed is single, representative one of the small pictures corresponding to the pictures consecutively captured, or related to each other, thereby facilitating retrieval.

The conventional system as described above, however, suffers from the following drawbacks.

Storage of a number of picture files, for example, near 1000 sheets, in a sheet of optical disc will make it difficult to readily manage the picture files as in the case of photographic albums. Specifically, where a desired picture is retrieved through key words and the like, for example, if a single key word is involved in a number of picture files, it is necessary for an operator to remember a number of key words mutually different and input them a number of times until a desired picture file is reached. In this case, if the operator forgets any of the key words, it would be impossible to perform the retrieval. On the other hand, it could be considered that a desired picture file is retrieved by such small screen sections only. In this case, however, it would cost much time and labor to locate a desired picture through scrolling the screen sections for several hundered sheets of the picture file.

Further, in the case of generating small pictures, the small pictures are formed with a desired size by thinning inputted pictures. However, if the size of the inputted pictures is not uniform, the size of the generated small pictures will not be unified. This involves such a problem that when those generated small pictures are displayed altogether on a display unit there occurs a difficulty in arranging them on the area of the picture screen. Furthermore, when a file for storing small picture data is formed, even though the respective storage capacities allotted to sheets of small picture data are small, a file for storing, for example, 1000 sheets of small picture data will require several tens of megabytes in capacity. This may cause difficulties such as frequent failures in recording to a recording medium, thereby giving rise to a difficulty in handling the files.

SUMMARY OF THE INVENTION

It is therefore an object of the present invention to provide a digital image filing system of a reduced amount of recorded data of digital image with a retrieval of a part of interest of a recorded image performable at high speed.

It is another object of the present invention to provide a method of recording data files and a data filing system in which a huge amount of image data stored in a large storage capacity of recording medium is readily handled as if a photographic album were handled.

It is still another object of the present invention to provide a method of recording image files and an image filing system in which a huge amount of image data stored in a large storage capacity of recording medium is readily handled as if a photographic album were handled, and in addition small pictures are effectively displayed in screen sections and a file thereof is effectively established.

According to the present invention, there is provided a digital image filing system comprising: an image signal input unit for receiving an image signal representative of a frame of image; a block identification generating unit for dividing a field of image area formed by the image signal into a plurality of blocks each having the same size as one another and for generating identifications each assigned to associated one of the plurality of blocks; and a storage unit having a first area adapted to store image signals of the plurality of blocks for each block. The storage unit has a second area adapted to store an identification of desired one of the plurality of blocks.

Further, according to the present invention, there is provided a method of filing digital images, comprising the steps of: preparing an image signal representative of a frame of image; dividing a field of image area formed by the image signal into a plurality of blocks each having the same size as one another; assigning identifications to associated ones of the plurality of blocks, respectively; storing image signals of the plurality of blocks in a first area of a storage unit block by block; and storing an identification of desired one of the plurality of blocks in a second area of the storage unit.

Still further according to the present invention, there is provided a method of recording data file wherein a plurality of pieces of information including image information are entered and recorded onto a data recording medium as respective digital formats of data files, comprising the steps of: generating the plurality of pieces of information each as a predetermined format of data file; classifying the data files generated in said generating step into a plurality of sorts; forming sub-directories for registering the data files classified in said classifying step; generating reduced-image files each representative of a data file for each classification, including path images each to associated one of the respective sub-directories formed in the sub-directories forming step; and generating control information including paths from a main directory to the sub-directories and additional paths from the sub-directories through the reduced-image files to the data files.

Further, according to the present invention, there is provided a data filing system wherein a plurality of pieces of information including image information are entered and recorded onto a data recording medium as respective digital formats of data files, comprising: a data input unit for inputting a plurality of pieces of information including image information as the respective digital formats of data; a data file generating unit for generating the plurality of pieces of information entered through the data input unit each as a predetermined format of data file; a classifying unit for classifying the data files generated in the data file generating unit into a plurality of sorts; a directory forming unit for forming sub-directories each including associated data file classified by the classifying unit to register the sub-directories in a main directory as a tree; a reduced-image file generating unit for generating reduced-image files each representative of a data file to be registered in the associated sub-directory, including path images each to associated one of the sub-directories formed in said sub-directories forming unit; a control information generating unit for generating control information including paths from the main directory to the sub-directories and additional paths from the sub-directories through the reduced-image files to the data files; and a recording unit for recording the files and the information thus generated onto a recording medium in accordance with a predetermined format.

According to the present invention, there is provided a method of recording an image file wherein image information is recorded onto an image recording medium as the digital formats of image files, comprising the steps of: generating entered image data as a predetermined format of image file; generating a predetermined size of reduced-image data from the entered image data; classifying the image files generated in said image file generating step into a plurality of sorts; forming sub-directories including the image files classified in the classifying step; generating path images each representative of an aspect of classification to associated one of the sub-directories formed in the sub-directories forming step; and generating reduced-image data generated in the reduced-image data generating step as a predetermined format of reduced-image files each for associated one of the respective sub-directories formed in said sub-directories forming step.

Further according to the present invention, there is provided an image filing system wherein image information is recorded onto an image recording medium as respective formats of image files, comprising: an image file generating unit for generating entered image data as a predetermined format of image file; a reduced-image data generating unit for generating a predetermined size of reduced-image data from the entered image data; a classifying unit for classifying the image files generated in the image file generating unit into a plurality of sorts; a directory forming unit for forming sub-directories including the image files classified in the classifying unit; a path image generating unit for generating path images each representative of an aspect of classification to associated one of the sub-directories formed in said directory forming unit; a reduced-image data generating unit for generating reduced-image data generated in said reduced-image data generating unit as a predetermined format of reduced-image files each for associated one of the respective sub-directories generated in the directory forming unit; and a recording unit for recording the files and the information thus generated onto a recording medium in accordance with a predetermined format.

BRIEF DESCRIPTION OF THE DRAWINGS

The objects and features of the present invention will become more apparent from consideration of the following detailed description taken in conjunction with the accompanying drawings in which:

FIG. 15 shows an example of a reduced-image file produced in accordance with the data filing system shown in FIG. 11;

FIG. 16 shows an example of a header in the file shown in FIG. 15;

FIG. 17 shows an example of an image classification in the file shown in FIG. 16;

FIG. 18 shows an example of an optional description in the file shown in FIG. 17;

FIG. 19 shows an example of a data entry in the file shown in FIG. 15;

FIG. 20 shows an example of information formed in the file shown in FIG. 19;

FIG. 21 shows an example of an album file produced in accordance with the data filing system shown in FIG. 11;

FIG. 24 shows another example of an album file produced in accordance with the data filing system shown in FIG. 11;

FIG. 25 shows still another example of an album file produced in accordance with the data filing system shown in FIG. 11;

FIG. 33 shows an example of path images of the albums produced in accordance with the image filing system shown in FIG. 28;

FIG. 35 shows an example of a class file produced in accordance with the image filing system shown in FIG. 28;

FIG. 37 shows another example of the class file produced in accordance with the image filing system shown in FIG. 28.

DESCRIPTION OF THE PREFERRED EMBODIMENTS

Figure 1:
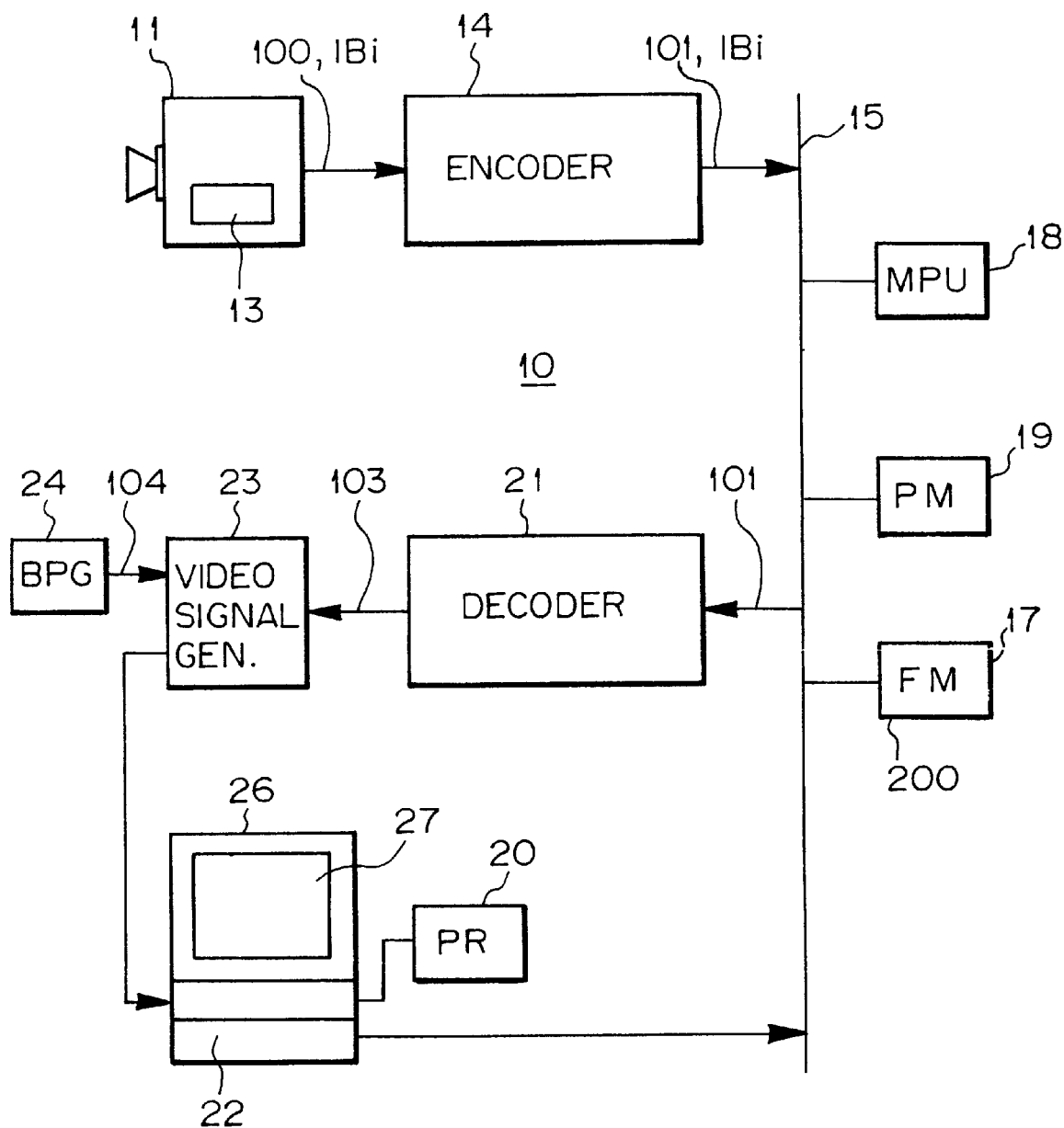
FIG. 1 is a schematic block diagram showing a digital image filing system according to one illustrative embodiment of the present invention.
Figure 2:
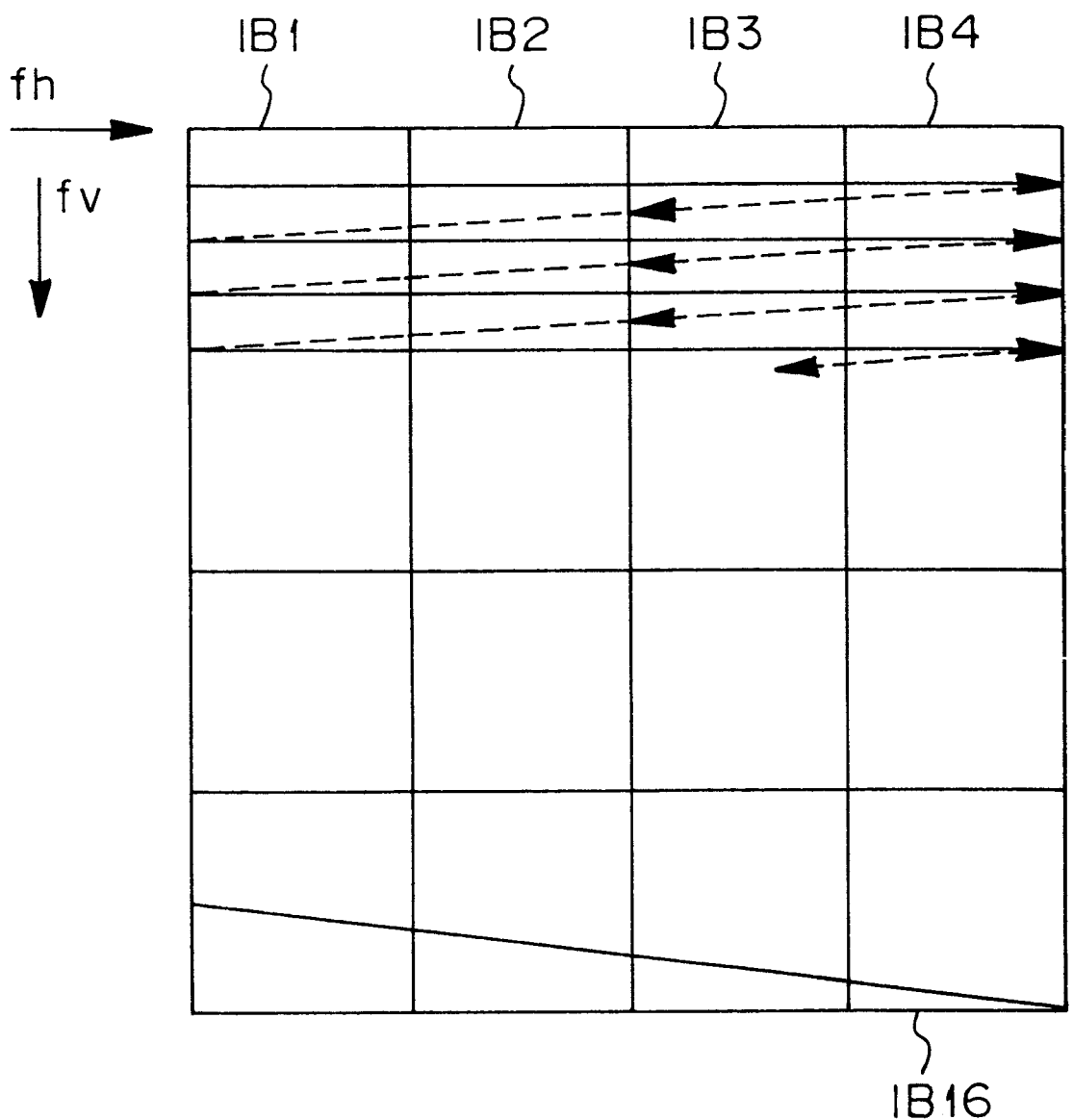
FIG. 2 is a plan view of the image blocks of the photosensitive surface of an image sensor of the electronic still camera shown in FIG. 1, which is useful for understanding how to scan horizontally.

Now referring to the accompanying drawings, a preferred embodiment of a digital image filing system of the present invention will be described. FIG. 1 is a schematic block diagram of a digital image filing system 10 according to one embodiment of the present invention. In this embodiment, the digital image filing system of the invention is applied to an electronic still camera 11. The electronic still camera 11 serves as an image signal generating apparatus for imaging an object to generate an image signal representative of an image of the object in the form of digital data. The electronic still camera 11 has a photosensitive surface or field 12, FIG. 2, formed by a bi-dimensional array of photosensitive cells of a charge-coupled device (CCD), not shown. An object image is formed on the photosensitive surface 12 by an incident light from the object. The electronic still camera 11 performs a raster scanning over the whole field 12 to repetitively transfer a line of pixel signals in response to a horizontal and a vertical transfer clock $f_h$ and $f_v$, supplied from a CCD drive circuit, not illustrated, to output a digital image signal 100 including a luminance signal Y and color signals R and B. The area of the image field formed by the image data outputted from the photo-sensitive surface 12 is partitioned into, for example, n pieces of unit area constituted of 64×64 pixels, i.e. image blocks IB1 to IBn, and is subjected to an image processing, for example, a data compression on a block-by-block basis. The dimensions of the block are not restricted to the values exemplified above, but, of course, may be larger than 64×64 pixels, for example. However, in general, a selection of the smaller size of blocks will make it difficult for a person to identify them as an image, since they are too small as a unit for setting up the most significant image block (MSIB), which will be described later, and not suitable for practical use. Of course, there is no need to design blocks having the same number of pixels both in horizontal and vertical directions. FIG. 2 shows the photo-sensitive surface 12 including 16 blocks (n=16) for the purpose of simplicity in understanding.

Figure 3:
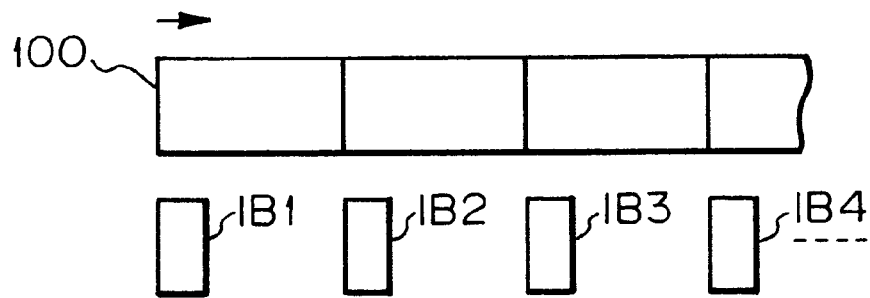
FIG. 3 shows schematically a data format of image signals and image block numbers outputted from the electronic still camera shown in FIG. 1.

The electronic still camera 11 has a block number generator 13, FIG. 1, which serves as a data generator circuit for generating signals $nf_h$ from the clock $f_h$, producing image block numbers IBi through counting the signals $nf_h$ and the vertical transfer clock $f_v$, and outputting the image block numbers IBi thus produced from the output 100. FIG. 3 shows how the image signals 100 are outputted in the order of the image block number in the horizontal scanning, and the image signals 100 are outputted in parallel with data each representative of the associated image block number IBi attached at their respective tops, where i is an integer of 1 to n.

Figure 4:
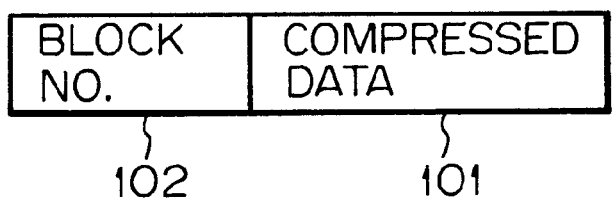
FIG. 4 shows schematically a data format of compressed data and an image block number outputted from the encoder shown in FIG. 1.

The image signals 100 and the image block number IBi, which are outputted from the electronic still camera 11, are fed to an encoder 14, FIG. 1, for practicing data compression and conversion on the image signals 100 according to the JPEG (Joint Photographic Coding Experts Group) scheme. Specifically, the image signals 100 are subjected to a discrete cosine transform (DCT) process, a quantizing process and a Huffman coding process, thereby being converted into compressed data 101 for each image block, as shown in FIG. 4.

Appended to the compressed data 101 is the associated image block number IBi. Then, those are outputted on a data bus 15 in the order of the horizontal scanning. In the DCT process, the image signal 100 is initialized from the top of the block whenever the image block number 102 occurs. Thus, the compressed data 101 is independent of image block by block, so that, during the inverse DCT conversion for decoding, the prediction value of DC components can be initialized. Consequently, it is possible to combine the compressed data 101 with any image block on an image block-by-block basis, as will be described later. In this manner, according to the present embodiment, the image compression is performed image block by block. There is thus an advantage such that a high compression ratio can be attained, since, in general, each image block involves less variation in picture pattern.

Figure 5:
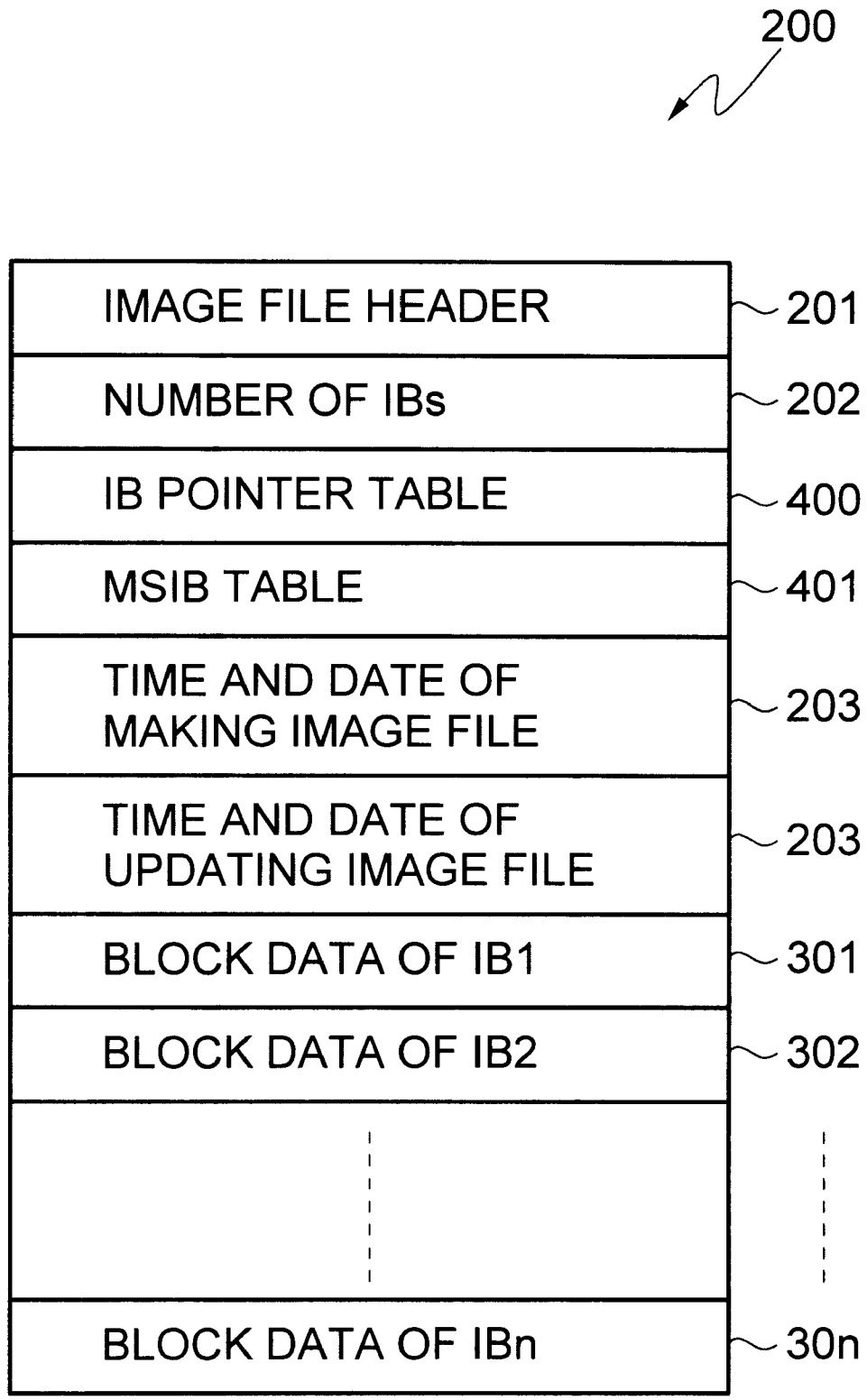
FIG. 5 shows schematically a basic format of an image file according to the FIG. 1 embodiment.

Referring to again FIG. 1, the main system is provided with a file memory (FM) 17 which may be constituted of a large storage capacity of memory such as an optical disc adapted for storing an image file 200 therein. The basic arrangement of a storage area for the image file 200 is shown in FIG. 5 by way of example. The image file 200 is provided for each one picture sheet (field) and has data fields, as shown in FIG. 5 and will be described hereinafter.

An image file header 201 is an area for storing therein file numbers and image names. The successive area 202 is for storing therein the number of image blocks IBi which constitute an image field, as shown in FIG. 2; and an area 203 for storing therein a time and a date of generating the image file 200. The n sub-areas 301–30n are associated with the image blocks IB1–IBn and serve as storage areas for storing therein the associated compressed data 101. An IB pointer table 400 is an area for storing therein pointers each for indicating the top address of a storage location of the compressed data areas 301–30n. An MSIB table 401 is an area for storing therein indications each for indicating the most significant image block (MSIB), for example, the number IBi of the most significant image block and a macro-block number, which will be described later. It is possible to store a plurality of MSIB numbers. Further, with respect to combinations of the most significant image blocks, it is acceptable to provide plural ways of combination, such as the first, second, third candidates of combination and so on. In the later case, each of the plurality of combinations corresponds to one associated macro-block number.

Returning to FIG. 1, the main system is provided with a microprocessor (MPU) 18 which is connected through a data bus 15 to a program memory (PM) 19, the file memory 17, an encoder 14, a decoder 21 and a terminal unit 22. The microprocessor 18 serves as a control unit for reading the compressed data 101 outputted from the encoder 14 in response to control program sequences such as a file forming program and an image reproducing program, and recording the data thus read into data areas 301–30n of the file 200 associated with the image block number 102. The microprocessor 18 has also, in a file reproducing mode, such a function that the recorded data 101 in data areas 301–30n are read in the order of the horizontal scanning of the image field, and the data thus read out are fed to the program memory 19. The above-mentioned file forming program and the image reproducing program have been stored in the program memory 19.

Figure 6:
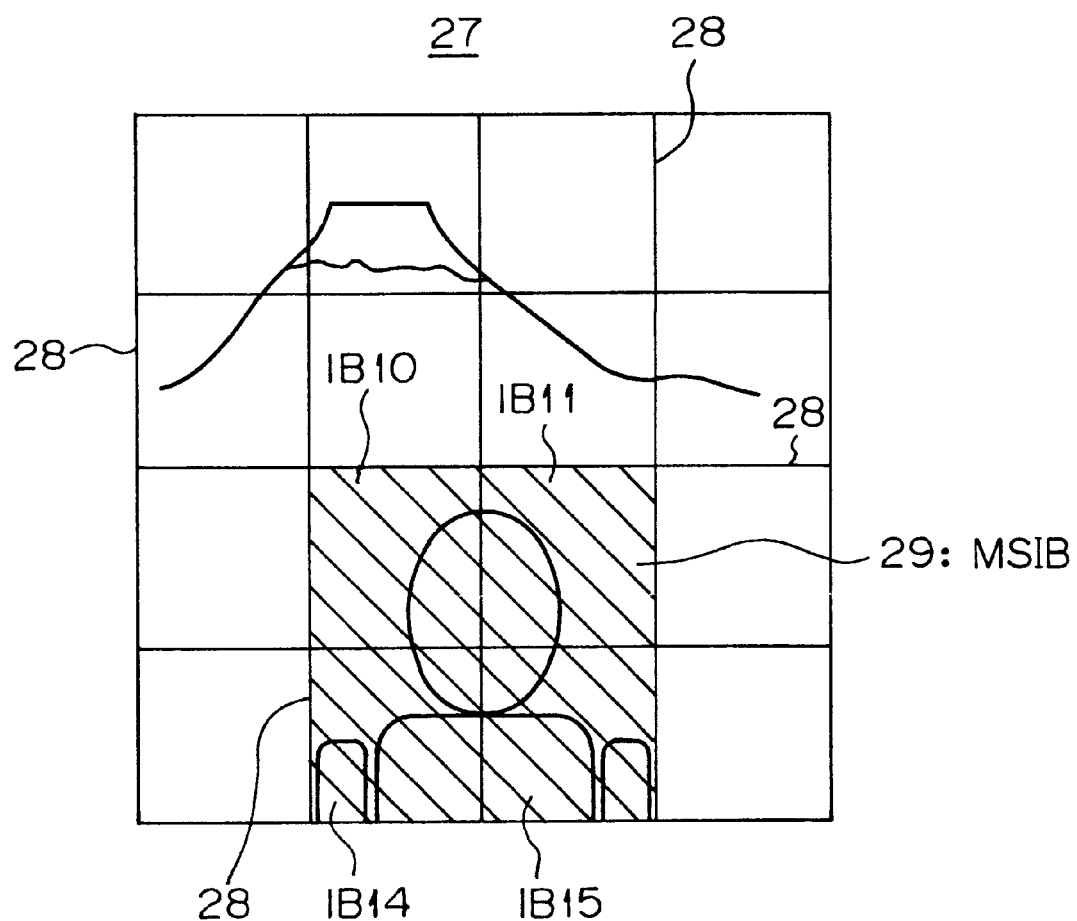
FIG. 6 shows an example of image and image blocks displayed on the screen of the monitor TV shown in FIG. 1.

The decoder 21 is a circuit for decoding input data by entropy decoding, dequantizing the decoded data, and performing the inverse discrete cosine transform process to output the reproduced image signal 103 in the raster scanning fashion on a video screen. The input data of the decoder 21 is the compressed data 101 which is independent of image block by block IBi, as mentioned above. Thus, it is possible to easily perform initialization of the decoding. The reproduced image signal 103 is fed to a video signal generating circuit 23 which is so arranged that, upon receipt of the reproduced image signal 103 and a lattice pattern signal 104 generated by a block pattern generator 24, those signals 103 and 104 are converted into a video signal, which is in turn passed to a monitor display 26 of the terminal 22 to be converted into a visible image. The block pattern generator 24 can be turned on and off in response to the terminal 22. On the screen 27 of the monitor display 26, as shown in FIG. 6 by way of example, there is displayed an image represented by the reproduced image signal 103 with a lattice pattern 28 superposed.

The lattice pattern 28 is a figure forming the boundaries between adjacent ones of the image blocks IB1–IBn shown in FIG. 2. Hence, according to the present embodiment, the unit lattice includes 64×64 pixels. An operator may set up optionally one or more of interest among the image blocks IB1–IBn as the most significant image block 29 on a unit lattice basis. This setting up is implemented through an operator unit such as a keyboard and a mouse of the terminal 22. Inputting numbers of the image blocks to be designated as the most significant image block 29, e.g. IB10, IB11, IB14 and IB15, and a macro-block identification, such as a number, entered through the terminal 22 to be allotted to the whole areas forming the most significant image block 29 causes the processor 18 to register the macro-block number and the numbers of the image blocks IB10, IB11, IB14 and IB15 in an MSIB table of the file 200 shown in FIG. 5. In addition, according to the present embodiment, the set-up areas of interest are displayed on the screen 27, as shown in FIG. 6, with the most significant image block MSIB shaded. It is not always necessary to use numbers to designate the image blocks IB10, IB11, IB14 and IB15, but is acceptable that for example, with a system having a mouse, not shown, in its terminal 22, the designation is made by a cursor indicated on the screen 27 by operating the mouse. Further, where the system is designed to designate only one of the macro-blocks, it does not necessarily need the macro-block identification.

In an image block reproducing mode, which will be described later, when a macro-block number is inputted through the terminal 22, the processor 18 reads out from the file 200 the compressed data of the macro-block associated with the macro-block number, so that only images of the most significant blocks 29 included in the macro-block are displayed on the monitor display 26. The main system is provided with a printer (PR) 20 which is connected to the terminal 22. The printer 20 is a color printer for printing an image represented by the image data decoded by the decoder 21.

The main system 10 of the illustrative embodiment is operative in operating modes for file registration, most significant block registration and image block regeneration.

When the file registration mode is designated through the terminal 22, the processor 18 causes the electronic still camera 11 to be in an operative state. The electronic still camera 11 drives the photo-sensitive array 12 of the imaging device in a raster scanning fashion to output to the encoder 14 the image signal 100 for each of the image blocks IB1–IB16 and the associated block number IBi. The encoder 14 performs, on the basis of the JPEG scheme, the compression and conversion on the image signals 100 transmitted from the electronic still camera 11, and passes the resultant, compressed data 101 for each image block and the associated image block number 102 on the data bus 15. The processor 18 provides such a control that according to the file forming program sequences stored in the program memory 19, the compressed data 101 from the encoder 14 are recorded in the data areas 301–30n, FIG. 5, of the file 200 corresponding to the associated image block number 102, the file number and the file name are registered in the image file header 201, the number of the image block IB is registered in the area 202, a time and a date of forming the image file are registered in the area 203, and the respective, top addresses of the data areas 301–30n are recorded in the IB pointer table 400.

When the most significant block registration mode is set up and the file number is entered, the processor 18 is operative in such a manner that the compressed data 101 are read out from the data areas 301–30n of the image file 200 of the file memory 17 in the order of the horizontal scanning of the image field and then passed to the decoder 21. The decoder 21 expands the compressed data 101 thus read out and outputs the reproduced image signal 103 to the monitor display unit 26. The monitor display 26 displays, as shown in FIG. 6, on its screen 27 an image represented by the reproduced image signal 103 and the lattice pattern 28. The operator determines a macro-block number directed to desired image blocks on the image block-by-block basis of the lattice pattern 28, and inputs the macro-block number together with the number of a single image block or a plurality of image blocks to be designated as the most significant image block by operating the terminal 22. The processor is operative to register the entered macro-block number and image block numbers IBi in the MSIB table 401. It is possible to print by the printer 20 an image represented by the decoded image data in the form of a color image in accordance with an instruction entered from the terminal 22.

In the image block reproducing mode, when the number of a desired file to be reproduced is entered and then the number of a desired macro-block to be reproduced is entered, the processor 18 is operative to read out the compressed data 101 of the macro-block of the file associated with the entered numbers and transfer the read out data to the decoder 21. The decoder 21 in turn expands the compressed data 101 thus read out, and the monitor display 26 displays on its screen 27 the image of the macro-block with an enlargement in the same size as the screen 27. It is possible to print by the printer 20 the macro-block image represented by the decoded image data in the form of a color picture in accordance with an instruction entered from the terminal 22.

Figure 7:
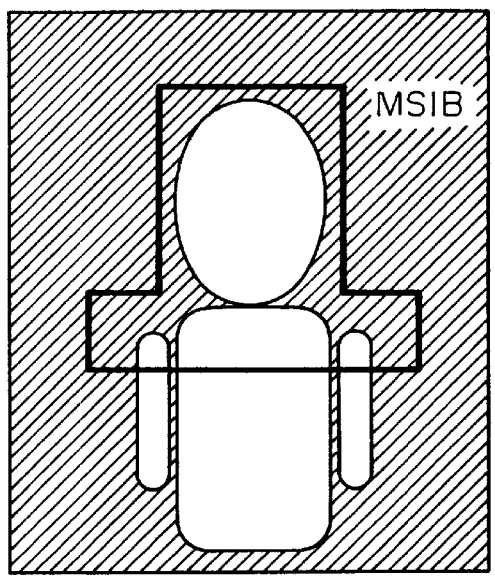
FIG. 7 shows an example of the most significant image block set up according to the embodiment shown in FIG. 1.
Figure 8:
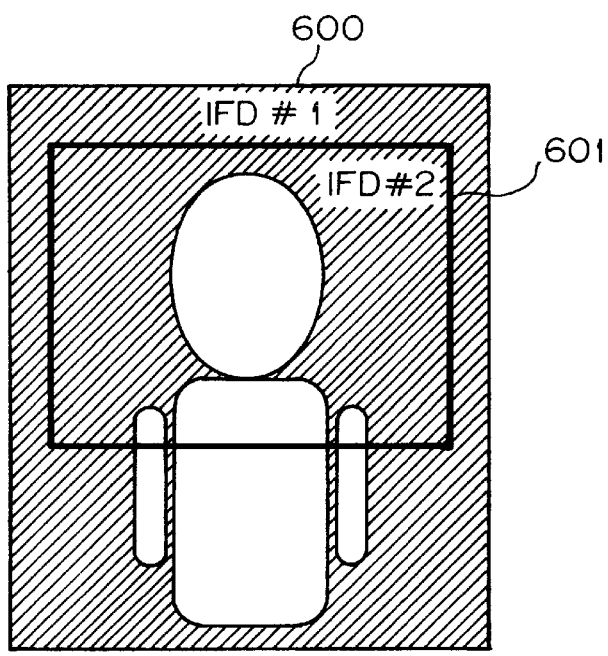
FIG. 8 is a view useful for understanding how to set up an area of interest according to the prior art.

FIG. 7 shows an example of a designation of the most significant image block (MSIB) according to the embodiment shown in FIG. 1. FIG. 8 schematically shows as a visible image an example of image data in an image file produced in accordance with the conventional TIFF (Tag Image File Format). Image data of the image area 600 over the whole image field and a rectangular portion 601 designated as an area of interest are saved in two files as image file data IFD#1 and IFD#2, respectively. This prior art system shown in FIG. 8 falls below the system shown in FIG. 7, even in the case of data not compressed, in the following respect.

According to the example shown in FIG. 8, the image data of the area 601 of interest is stored in double because the same data is also stored as part of the image data of the whole image field 600. Therefore, the image file data IFD#2 is merely prepared for the purpose of extracting the area of interest, and thus redundant. This causes the size of the file to be increased accordingly. The area 601 of interest has to be designated as a rectangle. Thus, it is impossible to finely extract any shape of area of interest, whereas the image file format according to the present embodiment permits the area of interest to be designated image block by block as any shape of most significant image block.

Figure 9:
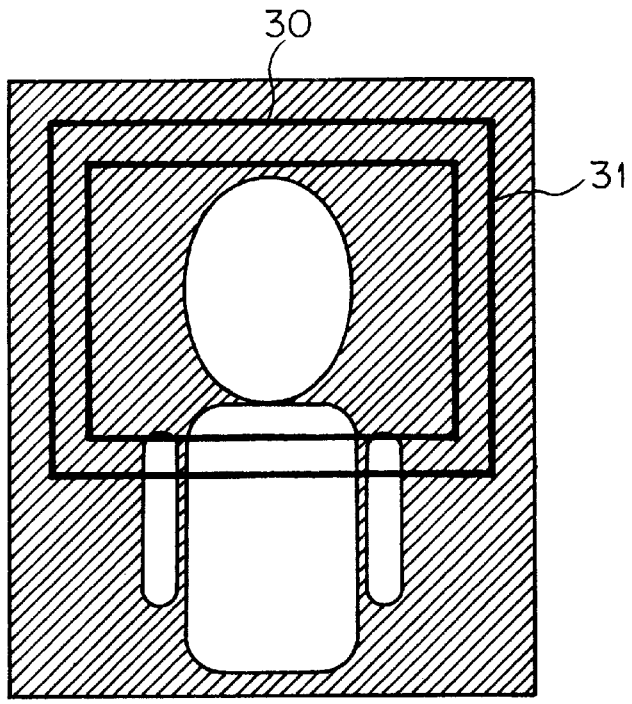
FIG. 9 shows an example of the most significant image block set up in a self-service photographing system according to the embodiment shown in FIG. 1.

FIG. 9 shows an example of the most significant block set up for a certificate photograph. With pictures which are photographed by an automatic camera device, an image of a person, particularly, the face portion of the person, may often be located in the same area of the viewing field of the camera. Where his or her face portion is designated as the most significant image block in the embodiment, a margin area 31, which is slightly spread over the minimum, necessary area 30 taking account of his or her height or sitting height, can be set up as the most significant block to fixedly establish the most significant block 31. In this manner, once the most significant block 31 is fixedly established in the system 10, it is possible thereafter to perform a photographic operation without considering the location of the most significant block, and also to perform automatically the image compression and the file saving. Such a set up of the most significant block 31 may be implemented through the terminal 22. In this case, a fixed value for designating the block number of the most significant block is written into the MSIB table 401 of the file 200 for each image under the control of the processor 18, whenever the photographic operation is carried out.

Figure 10:
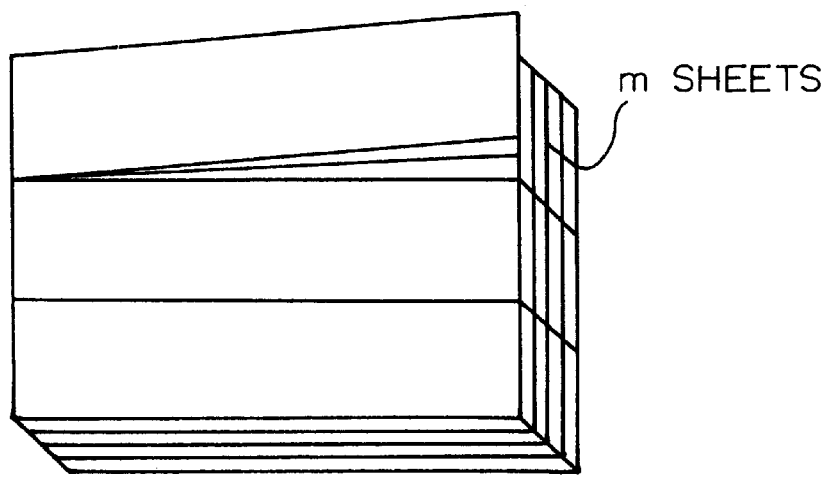
FIG. 10 shows schematically an example of images divided according to the embodiment shown in FIG. 1.

FIG. 10 shows schematically an example of images divided according to the embodiment shown in FIG. 1. For example, in the case of movie pictures, such as animations, which are produced by composing a plurality of picture frames, it is possible to compose the frames with portions of a background, moving persons and the like designated as the most significant blocks. According to the present embodiment, with respect to m (natural number) sheets of picture, their fields are each partitioned into, for example, three segments as illustrated. Thus, an optional combination of the segments among those fields makes it possible to produce $m^3$ fields from m sheets of picture. In this case, the designation of the most significant block is carried out through the terminal 22. The processor 18 provides control such that the MSIB tables 401 associated with the segments designated as the most significant block through the terminal 22 are retrieved from the image file 200, from which the image data 101 of the associated most significant block are in turn read out, and a composite image based on the image data in their combination are displayed on the monitor display 26.

Further, it is possible to produce a file for smaller pictures by editing only areas of interest from a number of images to create an index image. Producing such index images can be performed through retrieving the most significant blocks. It is thus possible to promptly display the index image on the monitor display 26.

According to the present invention, a photographic field is divided into a plurality of image blocks, independent, compressed data for each block is recorded in an image file, and areas of interest are registered with the macro-block number and the image block number, thereby reducing the amount of data of the image file comparing with the conventional system. Further, according to the present invention, it is possible to set up the area of interest image block by block and reproduce the minimum area of interest. This feature makes it possible to readily perform a partial reproduction of only an area of interest of an entire image field, and also to lower the redundancy in data storage and reduce the amount of data of the area of interest. Consequently, it is possible to reduce a period of time required for image reproduction in comparison with the conventional system which requires the whole area of an image field to be reproduced in order to reproduce an area of interest.

For example, when producing animations, a plurality of fields are each partitioned into a plurality of macro-blocks and recorded, and macro-blocks from different image fields are selected to be combined, the total number of sheets of produced image fields can be reduced with a time period reduced for reproduction.

Figure 11:
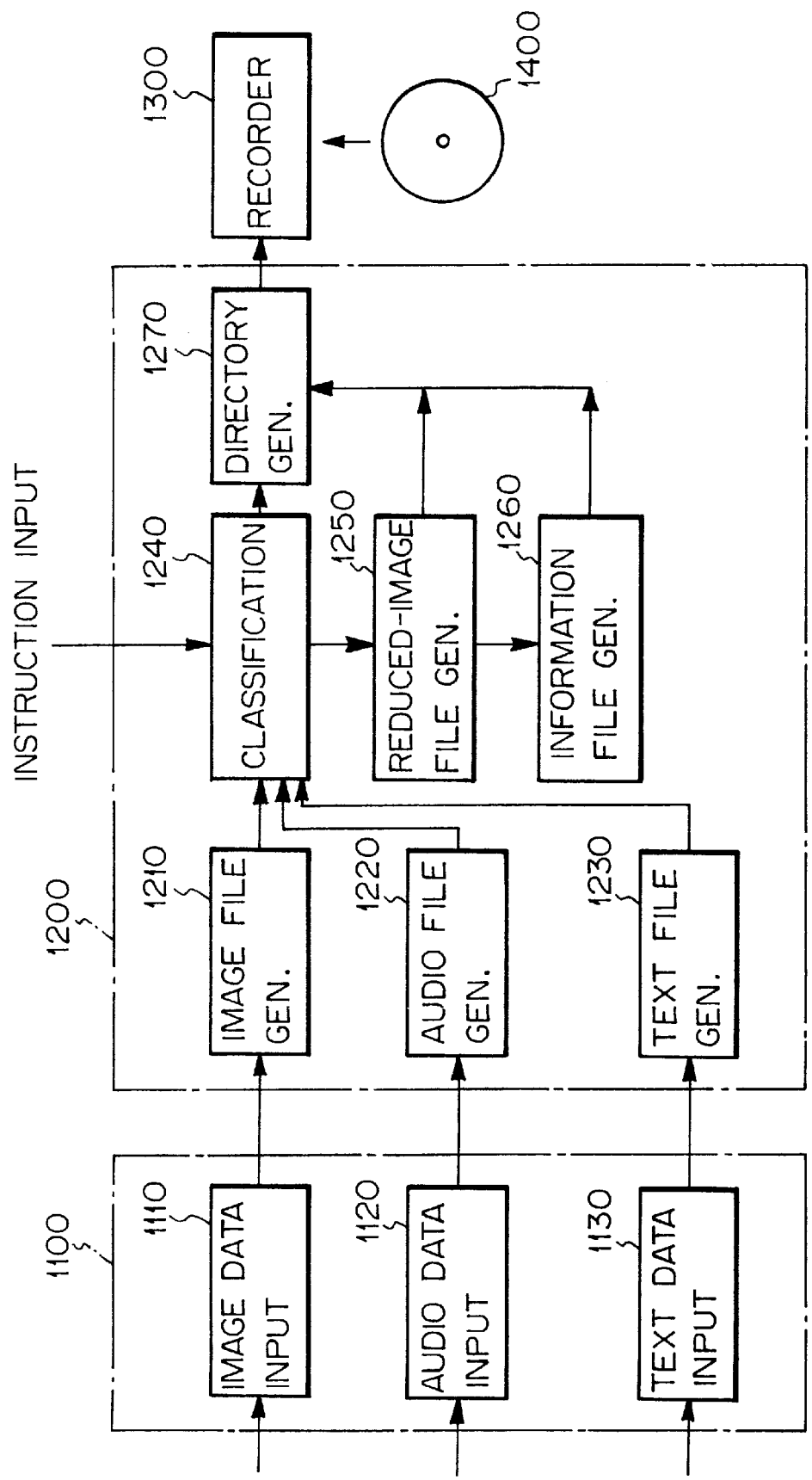
FIG. 11 is a schematic block diagram showing an illustrative embodiment of a data filing system to which a method of recording data files according to the present invention is applied.

Next, referring further to the accompanying drawings, another preferred embodiment of a method of recording a data file and a data filing system of the present invention will be described. FIG. 11 shows an illustrative embodiment of a data filing system to which a method of recording data file according to the present invention is applied. In this embodiment, as seen from FIG. 11, plural types of data including image data representative of still pictures such as photographs and the like, are supplied through a data input section 1100 to a data editing apparatus 1200 for making the respective data files. Those data files are recorded on an optical disc 1400 by a recorder 1300. Specifically, according to the present embodiment, the data files are classified according to an album format in a fashion similar to that of a photographic album, a path image is provided for each classification and files for reduced images, so-called thumbnail files, are formed from those data, and then those files are recorded together with the data files onto the optical disc 1400.

The data input section 1100 includes an image data input subsection 1110, an audio data input subsection 1120 and a text data input subsection 1130. As the image data input subsection 1110, an image reader, such as a film scanner for reading a photographic film to produce, for example, 1536× 1024 pixels of data in the form of 8-bit digital data for each color, red, green and blue (R,G,B), is advantageously available. In this case, each unit of the image data is outputted with the data capacity of about 9 megabytes. The audio data input subsection 1120 includes an analog-to-digital (A/D) converter for converting analog audio signals into 8 bits or 16 bits of digital data. For example, the A/D converter is adapted to convert, when a narration on and/or background music for image frames to be reproduced are inputted as voice signals, these audio signals are converted into corresponding digital data and then outputted. The text data input subsection 1130 includes a character converter, not shown, adapted for converting characters inputted from a keyboard and the like, attached to the data editing apparatus 1200, into corresponding codes under the coding scheme, such as the ASCII, and JIS formats. According to the present embodiment, the character input may include a description and the like on the images to be reproduced.

The data editing apparatus 1200 serves as a data processor in which program sequences for editing images are loaded in a central processing system, such as a personal computer and a work station, which additionally includes a display unit for displaying images, an input unit such as a keyboard and a pointing device, and a memory unit for storing data. Specifically, in the data editing apparatus 1200 according to the instant embodiment, data entered from the data input unit 1100 is compressed in accordance with a predetermined compression scheme to create data files, these files are classified in response to a classifying instruction from th e exterior, and hierarchical directory structure or hierarchical files are formed on the basis of the classification and then outputted to the recorder 1300. In more detail, as seen from FIG. 11, the data editing apparatus 1200 includes an image file generating subunit 1210, an audio file generating subunit 1220, a text file generating subunit 1230, a classification subunit 1240, a reduced-image file generating subunit 1250, an information file generating subunit 1260 and a directory generating subunit 1270.

The image file generating subunit 1210 converts image data including colors, red, green and blue (R,G,B) generated from the data input unit 1100 into YC data including a luminance signal Y and a color signal C, and compresses the YC data on the basis of, for example, the JPEG standard to create compressed data files. Specifically, 9 megabytes (MB) of image data generated from the data input unit 1100 are compressed by the YC conversion and the discrete cosine transform (DCT) into about 2.25 MB of data, and in addition are encoded with the Huffman coding or the like to form about 230 kilobytes (KB) of data file. In this case, as a recording medium, if a write-once optical disc having 140 MB of storage capacity, such as a minidisc (MD), is used for recording, more than 500 sheets of image file compressed to 230 KB are recorded thereonto, assuming that 20 MB of the 140 MB storage capacity are assigned to redundant files.

Similarly, the audio file generating subunit 1220 compresses audio data generated from the audio data input subsection 1120 into a predetermined format in which the audio data can be recorded onto an optical disc, according to the adaptive transform acoustic coding (ATRAC) scheme in the case of the minidisc, to generate audio files.

The text file generating subunit 1230 generates text files through the processing similar to that done by the audio file generating subunit 1220 on the text data supplied from the text data input subsection 1130.

Figure 13:
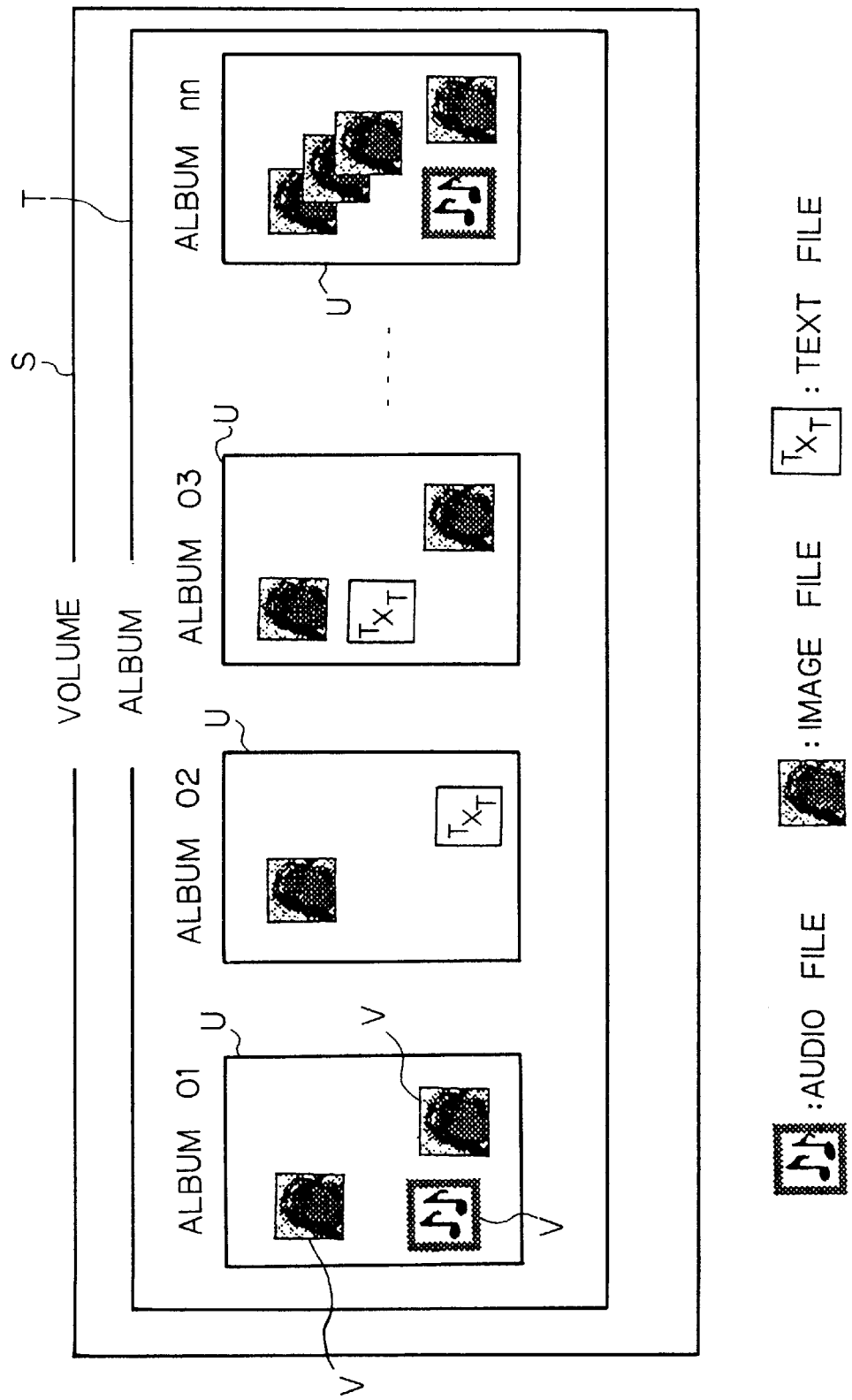
FIG. 13 shows an example of a display screen produced in accordance with the data filing system shown in FIG. 11.
Figure 14:
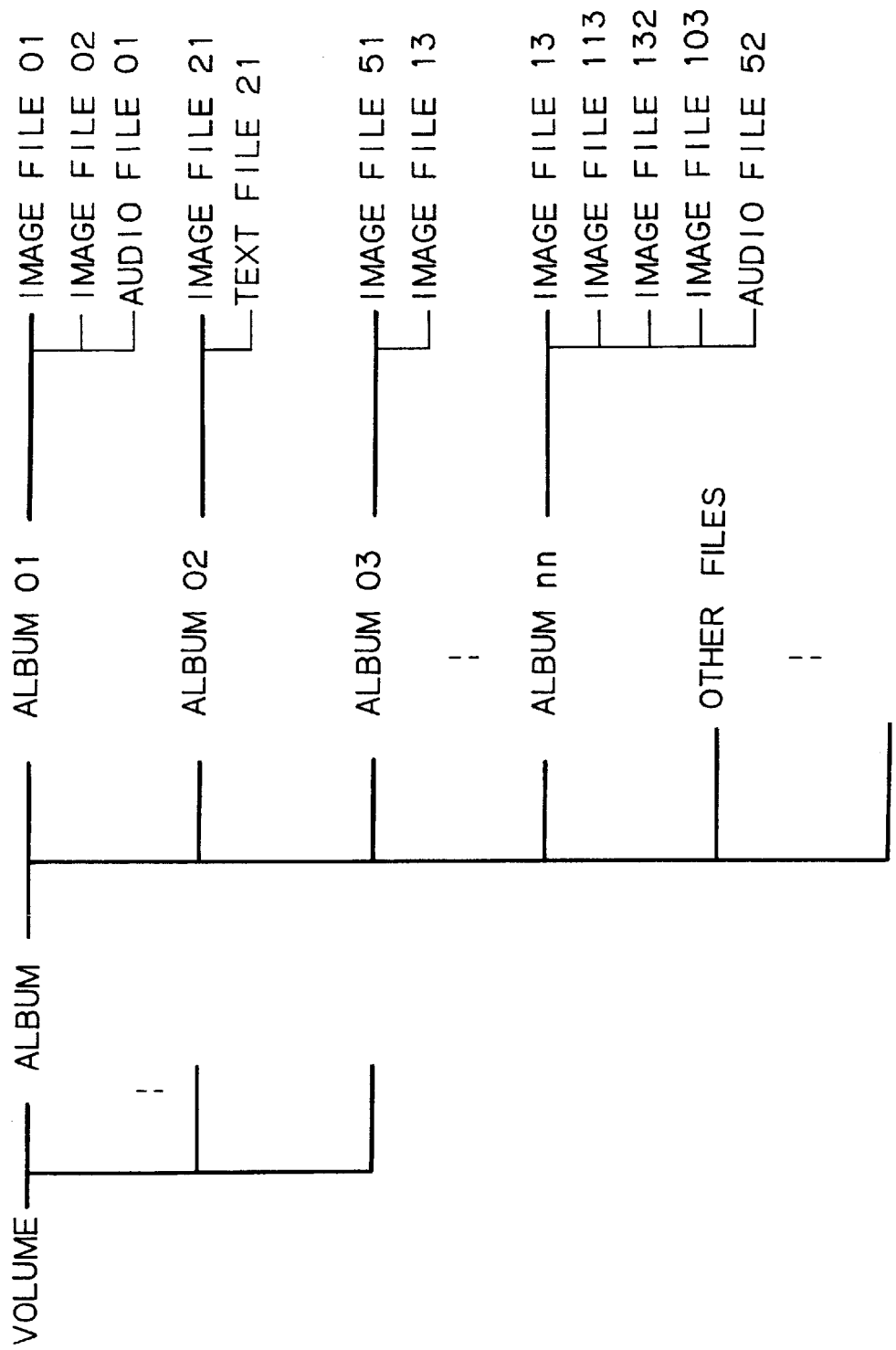
FIG. 14 shows an example of a directory structure produced in accordance with the data filing system shown in FIG. 11.

The classificating subunit 1240 serves to be responsive to a classification instruction for the data files supplied from the file generating bus units 1210, 1220 and 1230 in accordance with an operating instruction entered by an operator viewing the display and to classify the data files on the basis of the classification instruction. Specifically, on the display, as exemplified in FIG. 13, an album frame T indicative of the generic classification is formed within a volume frame S, and a plurality of species classification frames U, which may, for example, be albums 01–*nn*, are formed within the album frame T. A plurality of album frames T involved in the generic classification may be prepared within the volume frame S to be viewed by scrolling pages, and optionally a plurality of species classification frames U may be formed for each album frame T. Small picture areas, or icons, V representative of data files generated from the file generating subunits 1210, 1220 and 1230 are optionally registered in each of the species classification frames U, and movable by using a pointing device such as a mouse. In response to such a pointing device, as shown in FIG. 14, a plurality of generic classification of albums are sorted under the volume, the species classification of albums 01–*nn* are sorted under each of the generic classification of albums, and the image file, the audio file and/or the text file are optionally sorted in each of the species classification of albums 01–*nn*. The directory generating subunit 1270 and the file generating subunits 1250 and 1260 instruct how to classify those data.

The reduced-image file generating subunit 1250 generates files for storing reduced images of the data files. The reduced-image files include each, for example, as shown in FIG. 15, a header field 1450 indicative of the summarized contents of the file, an entry field 1500 to the reduced-image data, data field 1600 for storing reduced-image data and a spare field 1750.

The header field 1450 has, for example, 512 bytes of storage capacity as shown in FIG. 16, wherein 0–5th bytes are alotted for an identification number 1402 for identifying files; 6–7th bytes the version number 1404 of the standard; 8–13th bytes an image classification 1406 representative of the size of reduced image; 14–17th bytes a time and a date 1408 of making the file produced by a time stamper; 18th–21st bytes a time and a date 1410 of updating the file; 22nd–23rd bytes the number of reduced images 1412 recorded in the file; 24–55th bytes a file name 1414; and the remaining bytes spare bytes 1416. Specifically, the image classification 1406 includes, as shown in FIG. 17, an optional description field 1418, a spare byte 1420 and an offset pointer 1422. In the optional description field 1418, as shown in FIG. 18, when without any option, the four more significant bit positions include a predetermined value and the four less significant bit positions are prepared for spare bits. In this specific instance, it is described in the optional description field 1418 that the reduced image of which the size is one sixty-fourth of the usual television screen, i.e. 64×80 pixels of reduced-image data, is recorded.

The entry field 1500 has, for example, 256 bytes of storage capacity as shown in FIG. 19, wherein 0th–3rd bytes are used for an identification number 1502 of a data file associated with the reduced image; 4–14th bytes an album name 1504; 15–25th bytes a data file name 1506; 26–29th bytes an offset pointer 1508 of a reduced image; 30–159th bytes information 1510 on forming data; 160th–191st bytes a data name 1512; and the remaining bytes spare bytes 1514. Specifically, the data forming information 1510 includes, as shown in FIG. 20, the number of the standard 1520, the image forming scheme 1522, the orientation of the image 1524, the contents of the image formed 1526, the name of the software 1528, the model and the type of the input unit 1530 and 1532, copyright 1534 of the image, a time and a date 1536 of forming the image, a time and a date 1538 of forming the file, a time and a date 1540 of updating the file, the indication of protected or not 1542, and a spare byte 1544.

The data fields 1600, FIG. 15, store each reduced-image data indicative of the summarized contents of the associative data file. According to the present embodiment, the reduced image of which the size is one sixty-fourth of the usual television screen, i.e. 64×80 pixels of YC data, is recorded in the data fields 1600. This data is provided with about 10 kilobytes of capacity and is recorded onto an optical recording medium without compression. The spare field 1750 may record reduced-image data representative of, for example, a directory of albums 01–*nn*, that is, path-images of the albums 01–*nn*. With respect to this kind of data, in a similar fashion to that of the reduced-image data, 64×80 pixels of YC data is recorded in the spare field 1750 in the form of 10 kilobytes of non-compressed data.

Returning to FIG. 11, the information file generating subunit 1260 generates album files. The album files include each, as shown in FIG. 21, an album header 1602, an album attribute 1604, an album No. 1606, the number 1608 of albums, the name of the album 1610, a time and a date 1612 of making the album, a time and a date 1614 of updating the album, the numbers 1616 of the data files, a path 1618 to a path image of the album, and paths 1620 to the data files. The album attribute field 1604 is allotted for representing whether or not a sub-album is present.

The directory generating subunit 1270, FIG. 11, serves as generating file information indicative of positions in which the files generated by the file generating subunits 1210–1260 are recorded to establish a directory structure, which is described in accordance with the classification information provided from the classification subunit 1240. According to the present embodiment, in the information file generating subunit 1260, there are established paths from the albums to the sub-albums, and paths from the sub-albums to the reduced-image files and to the data files. Therefore, only defining of, for example, the position information of the files may provide a hierarchical file system on the software. As shown in FIG. 14, only directories and sub-directories may be built into the hierarchical structure.

The recorder 1300 records the files generated from the data editing apparatus 1200 onto the optical disc 1400 in accordance with a predetermined recording scheme. Specifically, as a recording scheme onto the optical disc 1400, there may be applicable, for example, a recording scheme adopting an Eight-to-Fourteen Modulation (EFM). The recorder 1300 is operative to record on the optical disc 1400 in the order from its innermost to outermost tracks of lead-in groove information indicative of the address of a track on the optical disc 1400, a so-called TOC (Table Of Contents), which is representative of the contents of information recorded and including directory information generated from the directory generating subunit 1270, and the album file, followed sequentially by the image file, the audio file, the text file and reduced-image file, and finally lead-out groove information.

Figure 12:
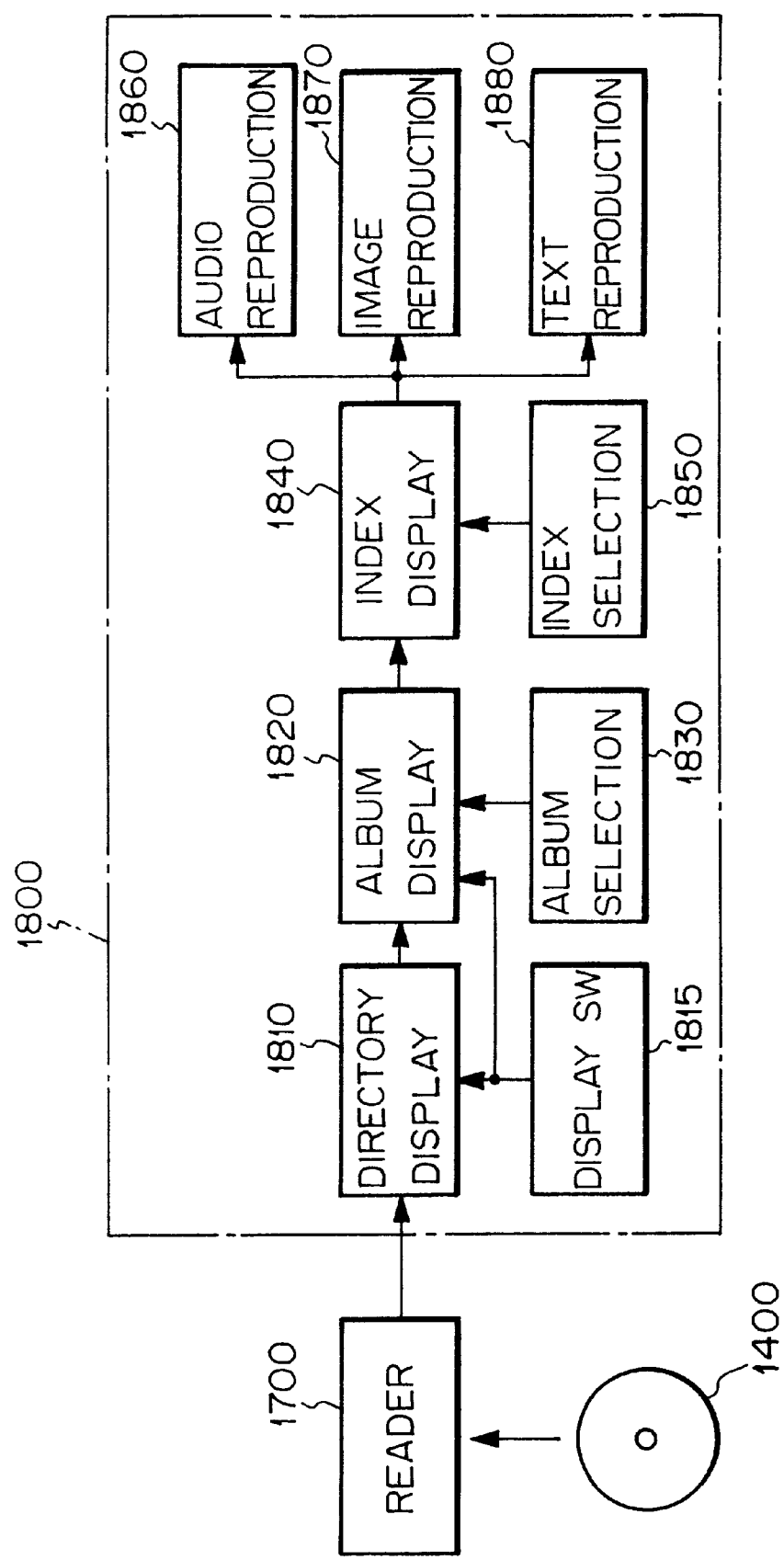
FIG. 12 is also a schematic block diagram showing an illustrative embodiment of a reproducing system adapted to reproduce data recorded in accordance with the data filing system shown in FIG. 11.

On the other hand, a system for reproducing data from the optical disc 1400 on which data have been recorded through the above-mentioned recording system includes, as shown in FIG. 12, a reader 1700 on which the optical disc 1400 is detachably mounted, and a reproducing processor 1800 for reproducing data from the contents recorded on and read out from the optical disc 1400. The reader 1700 is an optical reader for reading out the EFM signals from the optical disc 1400 and demodulating them into the original format of signals to supply the latter signals thus demodulated to the reproducing processor 1800. Specifically, when the optical disc 1400 is mounted, the reader 1700 identifies the position of the TOC representative of the contents of the disc from the lead-in groove information, reads out and transmits the TOC information to the reproducing processor 1800, and thereafter reads out the files in response to the instruction provided from the reproducing processor 1800. The reader 1700 may of course be designed to be integral with the recording apparatus 1300 in the form of a recording and reproducing apparatus.

The reproducing processor 1800 includes reproducing program sequences are loaded in its central processor similar to that of the data editing apparatus 1200, and performs the reproducing in response to reproduced data provided from the reader 1700 and operating instructions entered through the display and the like. According to the present embodiment, the reproducing processor 1800 comprises, as shown in FIG. 12, a directory display processing subunit 1810, a display switching subunit 1815, an album display processing subunit 1820, an album selection subunit 1830, an index display processing subunit 1840, an index selection subunit 1850, an audio reproducing subunit 1860, an image reproducing subunit 1870, and a text reproducing subunit 1880.

The directory display processing subunit 1810 serves to identify directory information contained in the TOC information received from the reader 1700 so as to display it in the form of, for example, the directory tree as shown in FIG. 14, on the display screen, not shown. The display switching subunit 1815 serves to perform switching between the tree display form and other display forms, such as album display form. The album display processing subunit 1820 serves to cause, upon receipt of a switching instruction from the display switching subunit 1815, the reader 1700 to read out an information file to display the album. For example, the album display processing subunit 1820 replaces for sub-albums 00–*nn* shown in FIG. 13 the corresponding path images representative of those sub-albums, and displays the latters on the display unit. The album selection subunit 1830 serves as responding the path image selected by the operator from the path images displayed on the display unit to switch the path image display to the index display.

The index display processing subunit 1840 serves to instruct the reader 1700 to read out the reduced-image file of the data registered in the album selected by the album selection subunit 1830, and executes the reduced-image file to be displayed. The index selection subunit 1850 serves to respond to the reduced image selected by the operator using the index display to instruct the reproducing processing subunits 1860, 1870 and 1880.

The audio reproducing processing subunit 1860 serves to instruct, when the data selected by the index selection subunit 1850 is audio data, the reader 1700 to read out the associated data file, and cause the audio data to be decoded and expanded to be reproduced. Similarly, the image reproducing processing subunit 1870 serves to instruct, when the data selected by the index selection unit 1850 is image data, the reader 1700 to read out the associated data file, and cause the image data to be decoded and expanded to be reproduced. The text reproducing processing subunit 1880 serves to instruct, when the data selected by the index selection subunit 1850 is text data, the reader 1700 to read the associated data file, and cause the text data to be reproduced. Those reproducing processing units 1860, 1870 and 1880 are adapted to repoduce, where the data are linked to each other, or, for instance, when image data is to be reproduced which is associated with audio and/or text data narrating the image, the audio and/or text data simultaneously with the image data being reproduced.

According to the data filing system as mentioned above, the information data are inputted in a digital form through the data input section 1100 to the data editing apparatus 1200, FIG. 11. For instance, the image data input subsection 1110 senses a still picture recorded on a silver-halide photosensitive material type of photographic film or the like to produce image data of R, G, B colors, each of which is in the form of 8-bit digital data, to the data editing apparatus 1200.

In the data editing apparatus 1200, the image file generating subunit 1210 compresses the image data, which are sequentially supplied thereto, in accordance with the predetermined compression scheme, and generates the image files. When the stream of image data is terminated, in a fashion similar to what is described above, the audio data input subsection 1120 samples the audio signal into a predetermined number of bits and supplies the bits of audio data to the data editing apparatus 1200, and the text data input subsection 1130 receives the text data of a predetermined code format in response to an instruction inputted from the keyboard and the like, and then supplies the received data to the data editing apparatus 1200.

Next, in the data editing apparatus 1200, those data are processed by the data file generating subunits 1210, 1220 and 1230 so as to generate image, audio and text files. Thereafter, an album name and so on for classification are inputted from the keyboard or the like. Thus, the classification unit 1240 creates on the display a species classification of albums 00–*nn*, in which reduced images each representative of the associated data file will in turn be sequentially registered. The registered information, i.e. the classification information, will be supplied to the reduced-image file generating subunit 1250, the information file generating subunit 1260 and the directory generating subunit 1270.

Upon receipt of the classification information, the reduced-image file generating subunit 1250 generates a reduced-image file including a header field and an entry field to data files in accordance with the classification information. At that time, the path images to the respective albums are recorded onto the file together with the reduced-image data. Likely, the information file generating subunit 1260 generates an information file including a header, a path to an album path image and a path to a data file. The files generated in these file generating subunits 1250 and 1260 are sequentially supplied to the directory generating subunit 1270.

Upon receipt of the files and the classification information, the directory generating subunit 1270 forms directories on the basis of the received information and sequentially supplies those to the recorder 1300. As a result, the recorder 1300 is operative to reserve recording areas on the optical disc 1400, in the order from the innermost to outermost tracks thereof, for lead-in groove information, TOC information including directory information, an information file, a data file and a reduced-image file, which will sequentially be recorded onto the optical disc 1400 under the EFM modulation.

Where the data file is to be reproduced, when the optical disc 1400 thus recorded is mounted on the reader 1700, first, the lead-in groove area is read out, and the position of a TOC area representative of the file contents is determined. Thus, the directory information included in the TOC area is read out and supplied to the reproducing processor 1800. Upon receipt of the directory information, the directory display subunit 1810 displays the directory on the display. A display switching instructed by the operator watching the screen of the display causes the display switching subunit 1815 to send out the switching instruction to the album display subunit 1820. Thus, the album display subunit 1820 drives the reader 1700 to read out the information file of the optical disc 1400 and identify the path images of the albums on the basis of the reduced-image files, and displays the album on the display screen.

A selection of a desired album by the operator watching the album displayed on the display screen causes the album selection subunit 1830 to send out the selection instruction. Thus, the index display subunit 1840 reads out reduced-image data of the associated album via the information files through retrieval of the reduced-image file, and performs an index display including a plurality of reduced images on the display. The operator may select a desired, reduced image through the display on the screen to reproduce a desired data file. As a result, the index selection subunit 1850 sends out a selection control signal to the reproducing subunits 1860, 1870 and 1880 to read out the respective data files from the optical disc 1400, thereby reading out desired data files.

If desired data is not displayed on the screen, the index screen may be scrolled to retrieve desired data. If desired data is not included in the album, returning to the album screen, another album will be selected and the above-mentioned operations will be repeated until desired data is obtained.

According to the embodiment of the method of recording a data file and the data filing system of the present invention, a large amount of data can be managed on the basis of a small amount of units. It is thus possible to arrange data in a simple way. Specifically, since the data files including the image files are managed album by album, adding data may be accomplished, for instance, by simply registering the data of interest into a desired album. In the case of reproducing data, it is possible to readily reproduce a desired data in such a way that selections are made on a desired album and then an index representative of the desired data in the album thus selected. In this case, for instance, when image data for more than 500 sheets are recorded on the optical discs and classified into three or more albums, for example, designing index image frames each including of 32 reduced images makes it possible to reach desired data by scrolling eight times at most. Thus, in order to display those index images, a memory of small storage capacity for storing eight image fields can be used. Therefore, there is an advantage such that the cost of the apparatus is reduced.

Figure 22:
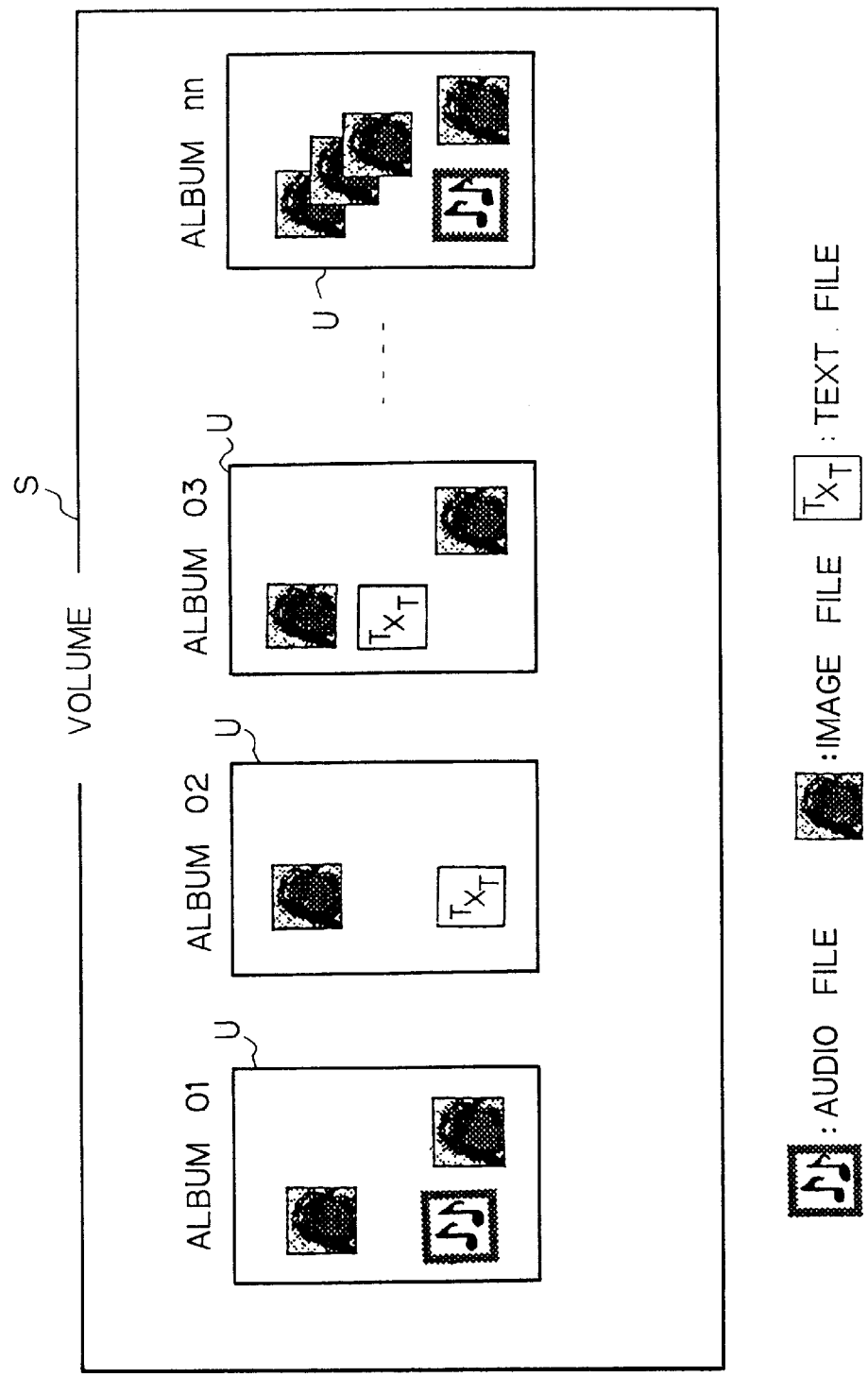
FIG. 22 shows another example of a display screen produced in accordance with the data filing system shown in FIG. 11.
Figure 23:
FIG. 23 shows another example of a directory structure produced in accordance with the data filing system shown in FIG. 11.

According to the present embodiment, the system is arranged to form a plurality of generic classifications of album T, with respect to which species classifications of album U are formed. Alternatively, a plurality of albums 01–*nn* may be registered directly in the volume S, as shown in FIGS. 22 and 23. Further, according to the present embodiment, the system is arranged to commence to display first the path image of the species classification of album U. However, as shown in FIGS. 24 and 25, the system may be adapted to form the generic and species classifications of album files in the information file and display the path image of the sub-album after having displayed the generic classification of album image. Furthermore, according to the present embodiment, the system is arranged to form the image file in the JPEG type of format. However, the image file may be formed in another type of format, for example, the TIFF format. In the latter case, the system may be designed to store classification codes to the header of the associated tags so as to establish a hierarchical structure. Still furthermore, the system according to the present embodiment is arranged to generate a path image when the album is created. However, the system may be adapted to provide path images by of a hybrid disc including a volume having a path image of a sub-directory determined beforehand.

According to the present embodiment, as a file recording medium onto which the data files are recorded, a small sized rewritable optical disc, or a so-called minidisc, is effectively applied. However, the present invention is not restricted to this kind of recording medium. It is possible to adopt any type of file recording medium, for example, a write-once compact disc, a CD-ROM which can be manufactured by a stamper or the like, an optical recording medium such as a large storage capacity of magneto-optical disc, a semiconductor recording medium such as an IC memory card, and a magnetic recording medium such as a magnetic recording tape.

Figure 26:
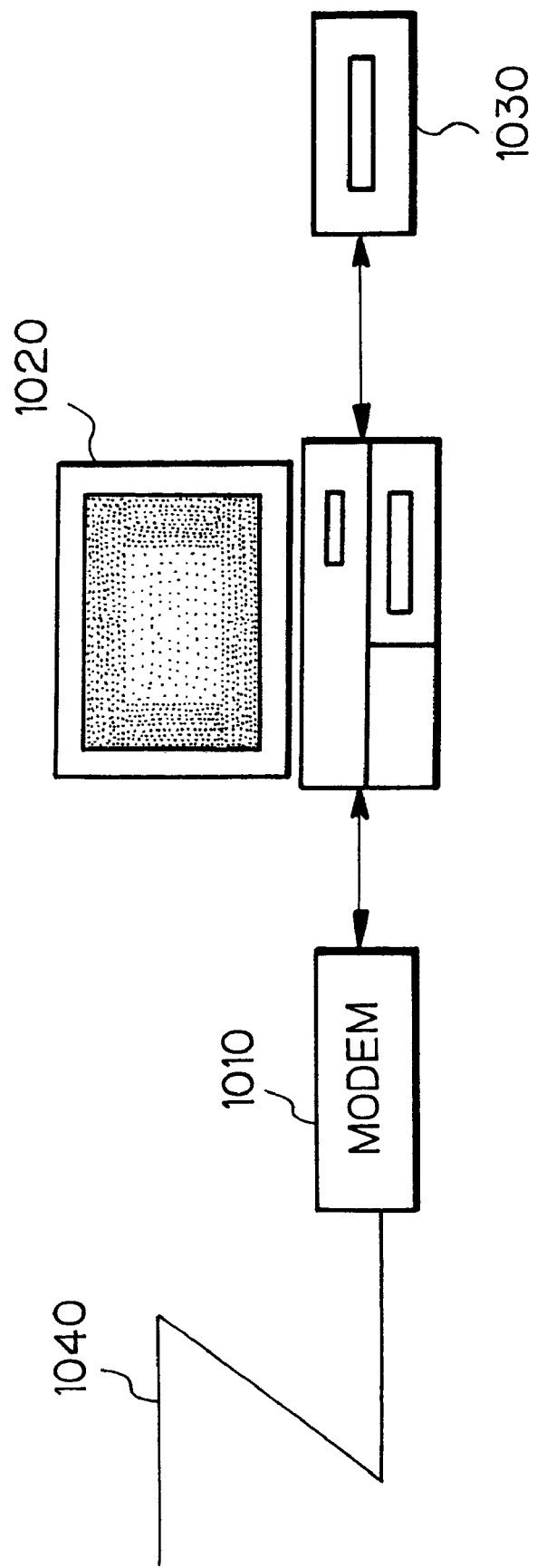
FIG. 26 is a schematic block diagram showing another illustrative embodiment of a data filing system to which a method of recording data files according to the present invention is applied.
Figure 27:
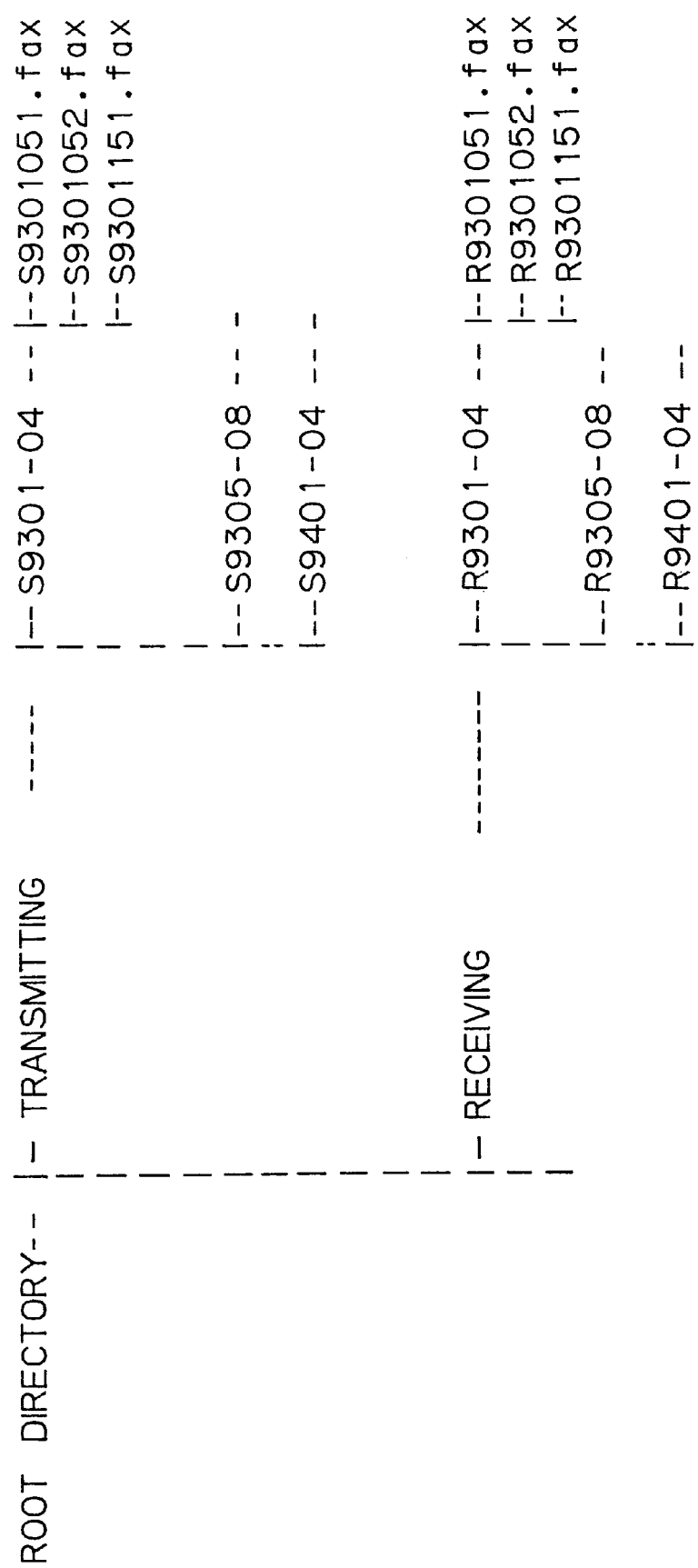
FIG. 27 shows an example of a directory structure produced in accordance with the data filing system shown in FIG. 26.

FIG. 26 shows another embodiment of data filing system to which the method of recording data file according to the present invention is applicable. The data filing system includes a facsimile modem 1010, a data editing apparatus 1020 and an external storage apparatus 1030. The facsimile modem 1010 is connected to a telephone line 1040 and serves to modulate and transmit facsimile data outputted from the data editing apparatus 1020 under a modulation scheme, and to demodulate data received over the telephone line 1040 and supply the demodulated data to the data editing apparatus 1020. The data editing apparatus 1020 causes the facsimile modem 1010 to transmit data produced by editing apparatus 1020 and the external storage apparatus 1030 to store the data thus transmitted. On the other hand, the data editing apparatus 1020 serves to sequentially store data received through the modem 1010 into the external storage apparatus 1030. The data editing apparatus 1020, as shown in FIG. 27, provides sub-directories for transmission and reception under the root directory, and forms file storage locations at a predetermined time interval under the respective sub-directories. In this manner, files of the facsimile data are recorded onto the corresponding date columns.

Thus, according to the present embodiment, when the binary image data such as facsimile data are recorded onto a recording medium, data files are recorded in a hierarchical directory structure, thereby readily classifying the data depending upon transmission or reception, a date and the like.

Figure 28:
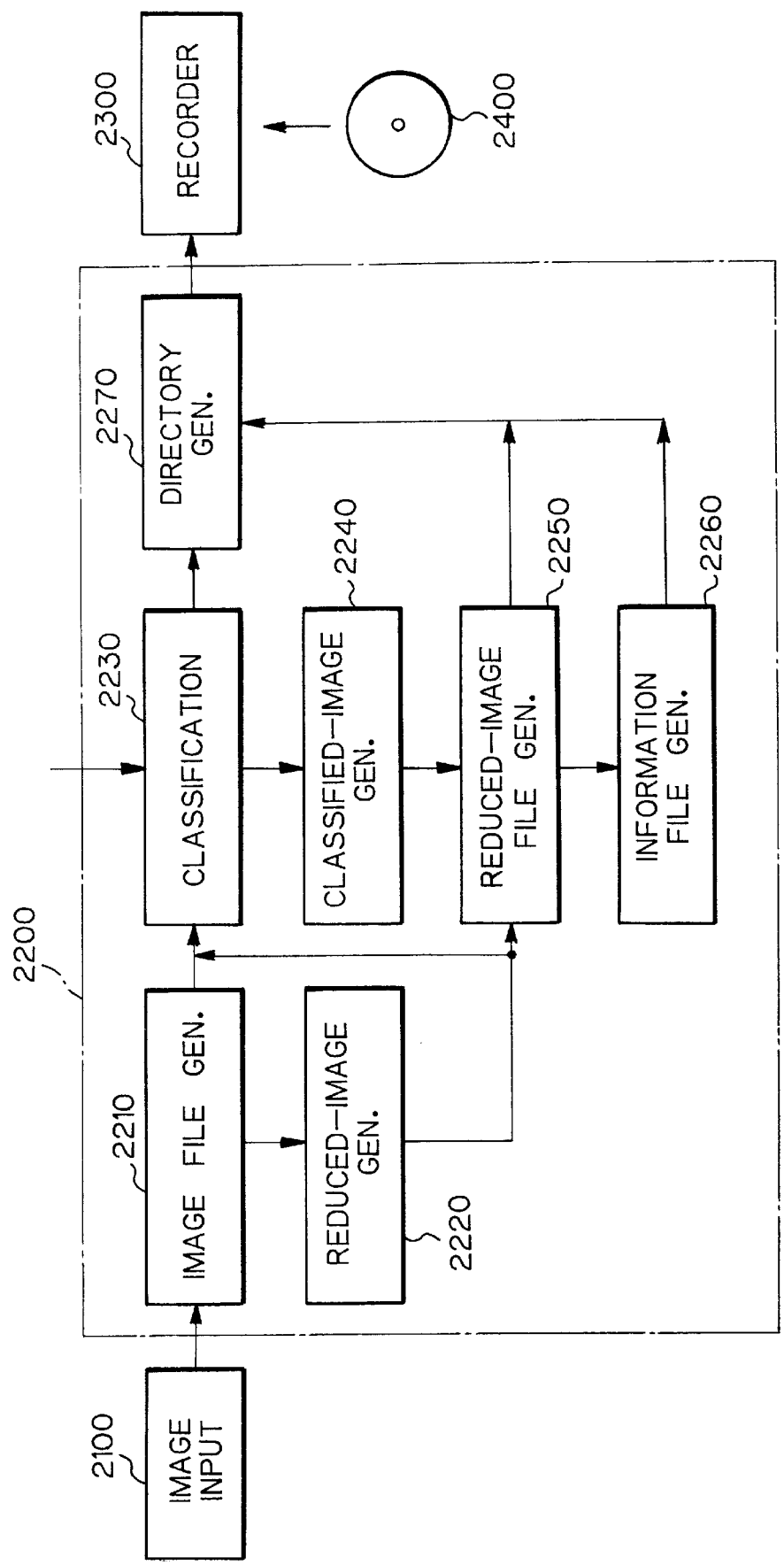
FIG. 28 is a schematic block diagram showing an illustrative embodiment of an image filing system to which a method of recording image files according to the present invention is applied.

Next, another preferred embodiment of a method of recording an image file and an image filing system of the present invention will be described. FIG. 28 shows an illustrative embodiment of an image filing system to which a method of recording an image file according to the present invention is applied. In this embodiment, as seen from FIG. 28, a plurality of types of data including data of still pictures such as photographs and data of an image into which a photograph has been taken in and modified by a computer or the like, are supplied through an image input apparatus 2100 to an editing apparatus 2200 for forming the image files. Those image files are recorded onto an optical disc 2400, such as a compact disc (CD), by a recorder 2300. Specifically, according to the present embodiment, the image files are classified according to a prescribed album format in a fashion similar to that of a photographic album, path images representative of features particular to the classifications are formed together with files of reduced images, so-called thumbnail files, established from the image files, and then those files are recorded together with the image files onto the optical disc 2400.

As the image input apparatus 2100, advantageously available is an image reader, such as a film scanner for sensing a still image carried on a negative film of photograph with a high resolution to produce several bits of digital data for each of colors, red, green and blue (R, G, B). In this case, for example, 3072×2048 pixels of image data are obtained from the negative film to be supplied to the editing apparatus 2200 in the form of several megabytes of data for each color, or in total of one ten and some megabytes of data. In the present embodiment, the image input apparatus 2100 may be adapted to receive data representing an image into which an image has been trimmed by another computer or the like.

The editing apparatus 2200 serves as an image editing apparatus in which program sequences for editing images are loaded into a central processor system such as a personal computer and a work station, and includes a display unit for displaying images, an input unit such as a keyboard and a mouse, and a memory unit for storing image data. Specifically, in the editing apparatus 2200 according to the present embodiment, a desired resolution of data are generated from image data supplied from the image input apparatus 2100, and the data thus generated are compressed in accordance with a predetermined compression scheme to form image files. These image files are classified in response to a classification instruction from the exterior, and hierarchical information files are formed on the basis of the classification. A reduced-image file for retrieval is also formed for each classification. More in detail, the editing apparatus 2200 includes an image file generating subunit 2210, a reduced-image generating subunit 2220, a classification subunit 2230, a classified-image generating subunit 2240, a reduced-image file generating subunit 2250, an information file generating subunit 2260 and a directory generating subunit 2270.

The image file generating subunit 2210 converts image data of colors, red, green and blue (R, G, B) generated from the image input apparatus 2100 into YC data including of a luminance signal Y and a color signal C, and if necessary, creates a plurality of resolutions of image data through a thinning processing, and then compresses the YC data on the basis of, for example, the JPEG scheme to produce resultant, compressed-data files.

Specifically, one ten and some megabytes of image data generated from the image input apparatus 2100 are compressed under the YC conversion and the discrete cosine transform (DCT), and in addition are encoded with the Huffman coding or the like to form an image file of several megabytes to several hundred kilobytes. In this case, for instance, 3072×2048 pixels of image data is compressed into data of about 4 megabytes, which enables 100–120 image files to be recorded on a compact disc of 600 megabytes. Where a usual television sized image is produced, 3072×2048 pixels of image data is of about 600 kilobytes, so that about 1000 image files can be recorded on a single compact disc of the like capacity. Advantageously, it is preferable to form a hybrid image file including 5 kinds of resolution of data, such as 16-base size (3072×2048), 4-base size (1536×1024), a base size (768×512), ¼-base size (384×256) and ¹⁄₁₆-base size (128×96).

Figure 30:
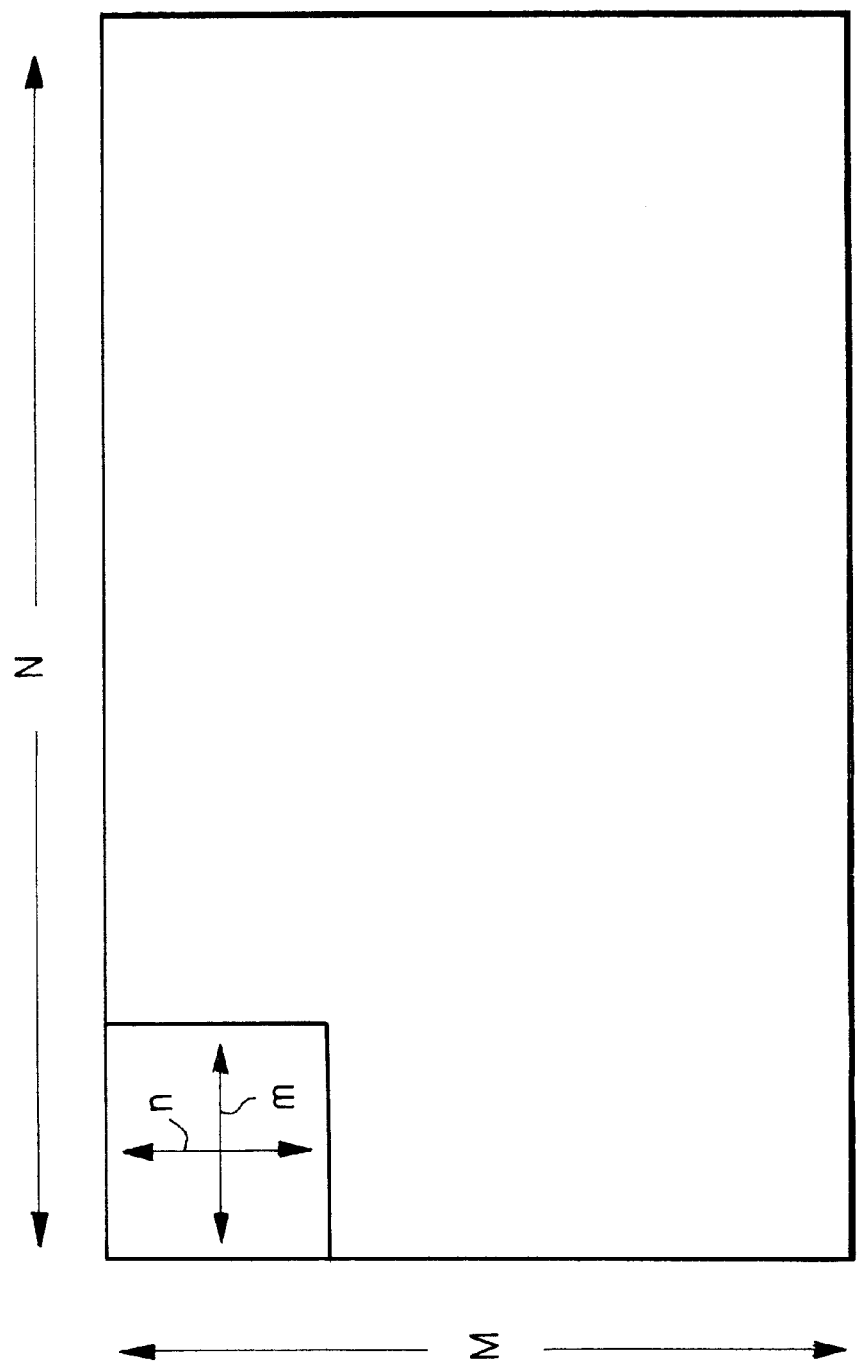
FIG. 30 is a typical illustration showing dimensions of a reduced image produced in accordance with the image filing system shown in FIG. 28.

The reduced-image generating subunit 2220 serves as a data processing unit in which a predetermined size of reduced image is generated for each of the image files on the basis of image data supplied through the image file generating subunit 2210. For example, as shown in FIG. 30, a display screen of M×N pixels is partitioned with a predetermined ratio into segments of n×m pixels, which are unified in size throughout the image frame to form reduced images. Particularly, according to the present embodiment, it sometimes happens that different sizes of image are taken in, since it is permitted to input not only a photographic size of image, but also an image modified by an user by trimming an original image. Hence, in the reduced-image generating subunit 2220, the entered image data or the minimum resolution of image data generated in the image file generating subunit 2210 is compared with the n×m pixels. If the image data is larger than the n×m pixels, then the image data is reduced through thinning by a suitable filtering processing; if smaller, then a frame of n×m pixel size is formed to surround the image; and if equal, then the image data is utilized as it is. In this manner, the image data is supplied to the reduced-image file generating subunit 2250 in the form of image data having the unified number of pixels.

Figure 31:
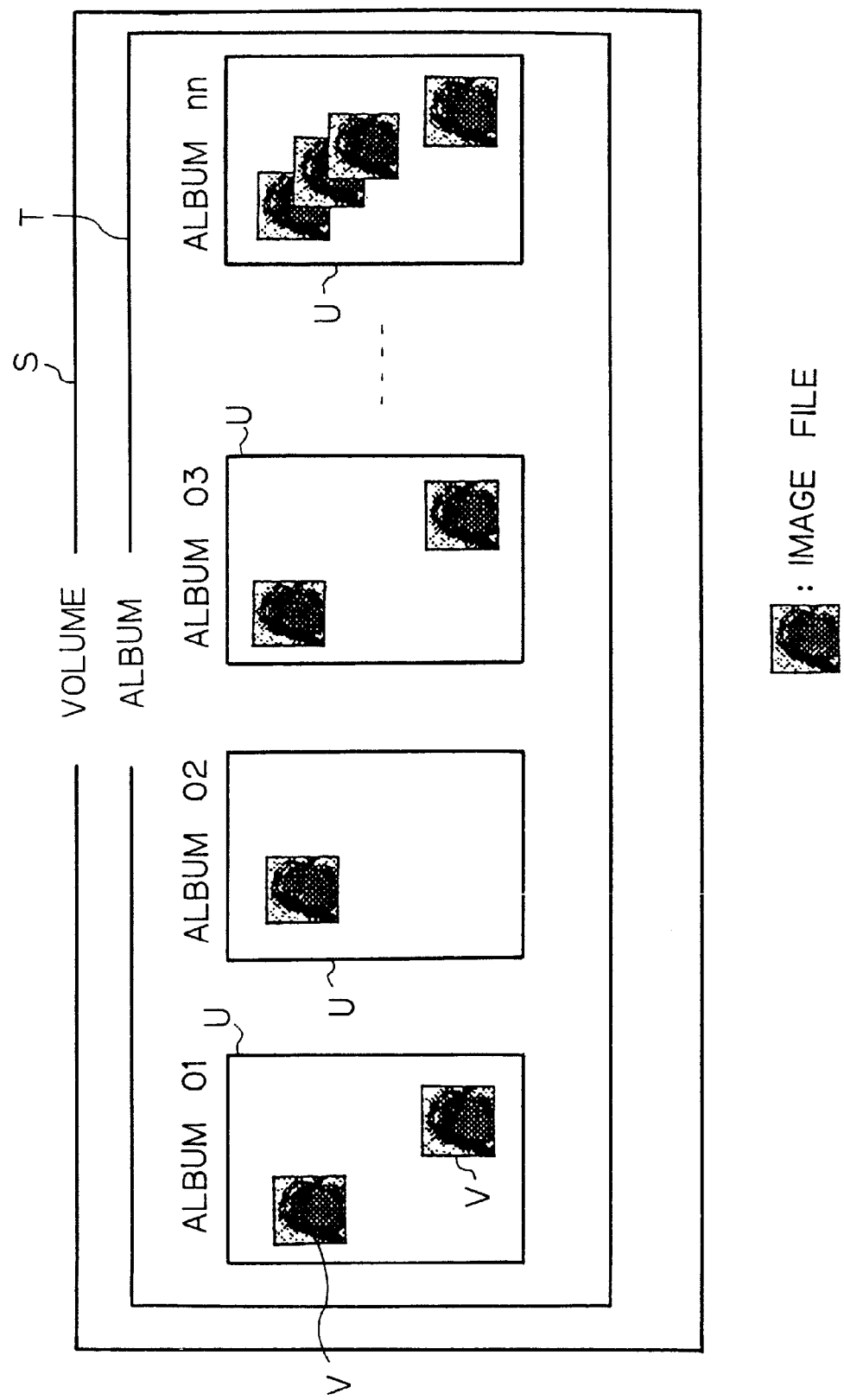
FIG. 31 shows an example of a classifying screen produced in accordance with the image filing system shown in FIG. 28.

The classification subunit 2230 serves to identify a classification for the image files supplied from the file generating subunit 2210 in response to an operating instruction by an operator viewing the display and to classify the image files on the basis of the classification instruction. Specifically, on the display, as shown in FIG. 31, an album frame T indicative of the generic classification is formed within a volume frame S, and a plurality of species classification frames U, for example, albums 01–*nn*, are formed within the album frame T. In this embodiment also, like those is shown in FIG. 13, a plurality of album frames T may be involved in the generic classification within the volume frame S to be viewed by scrolling pages, and optionally a plurality of species classification frames U may be prepared for each album frame T. Small picture portions or icons V generated from the reduced-image generating subunit 2220 are optionally registered in each of the species classification frames U and moveable by manipulating a pointing device such as a mouse.

Figure 32:
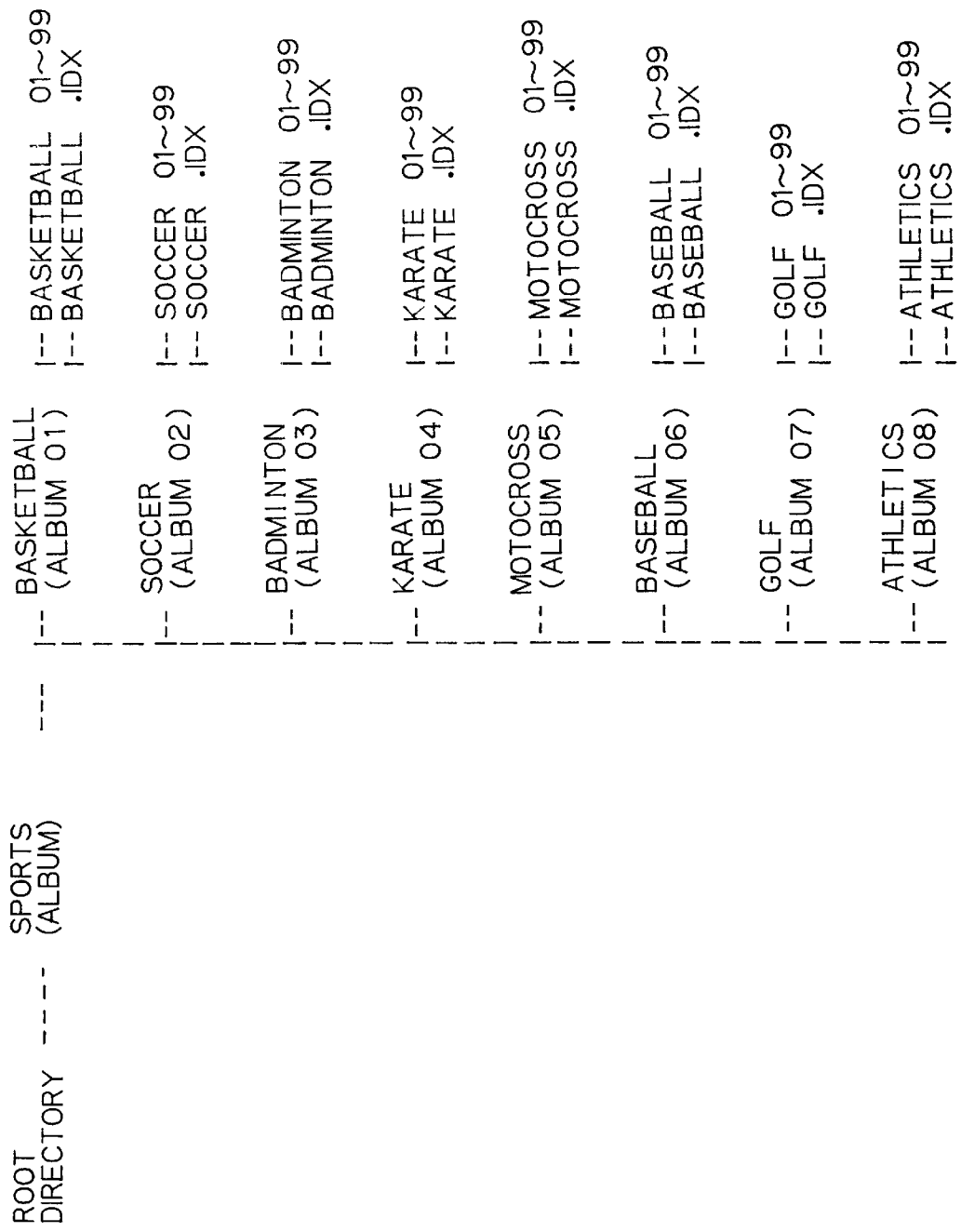
FIG. 32 shows an example of a directory structure produced in accordance with the image filing system shown in FIG. 28.

In response to entry of the instruction, as shown in FIG. 32, a generic classification of album, for example, sports album, is classified under the volume, the species classification of albums 01–*nn*, for example, basketball album, soccer album and the like, are classified under the generic classification of album, and the image files are classified in each of the species classification of albums 01–*nn*. The state of the classification is instructed to the classified-image generating subunit 2240, the file generating subunits 2250 and 2260 and the directory generating subunit 2270.

The classified-image generating subunit 2240 serves as generating path images each representative of an aspect of associated one of the albums classified by the classification subunit 2230. For example, the operator optionally selects any one of the classified image data, and modifies the selected one so that the image is reduced into the same size as the reduced-image data. For instance, path images as shown in FIG. 33 are generated for the corresponding species classification of albums, and arranged as exemplified in FIG. 34 to form an album selection screen.

The reduced-image file generating subunit 2250 generates for each of the albums files for storing reduced images of the image files generated in the reduced-image generating subunit 2220. With the illustrative embodiment also, the reduced-image files may include the same fields and logical structures as shown in FIGS. 15–20.

With the instant embodiment, the data field 1600, FIG. 15, stores therein reduced-image data summarizing the contents of the associative image file generated in the reduced-image generating subunit 2220. According to the present embodiment, the reduced image of which the size is one sixteenth or one sixty-fourth of the usual television image frame, i.e. 128×96 or 64×80 pixels of YC data reduced, is recorded in the data field 1600. This data is provided with about 10 kilobytes of capacity and is recorded onto an optical recording medium without compressed. The spare field 1750 may record therein reduced image data representative of, for example, a directory of albums 01–*nn*, that is, path-images of the albums 01–*nn*. With respect to this kind of data, in a fashion similar to that of the reduced image data, 128×96 or 64×80 pixels of YC data are recorded in the spare field 1750 in the form of 10 kilobytes of non-compressed data.

The information file generating subunit 2260, FIG. 28, generates album files. The album files include each, as shown in FIG. 35, an album header 2702, an album attribute 2704, the number of an album 2706, an album name 2708, a date of making an album 2710, a date of updating an album 2712, the number of albums 2714, the number of files of image 2716, a path 2718 to a path image of an album, and paths 2720 to the image files.

The directory generating subunit 2270 is similar in structure and function to the directory generating subunit 1270 mentioned earlier with reference to FIG. 11. Thus, redundant description is omitted. The recorder 2300 is also similar in structure and function to the recorder 1300 described with reference to FIG. 11.

Figure 29:
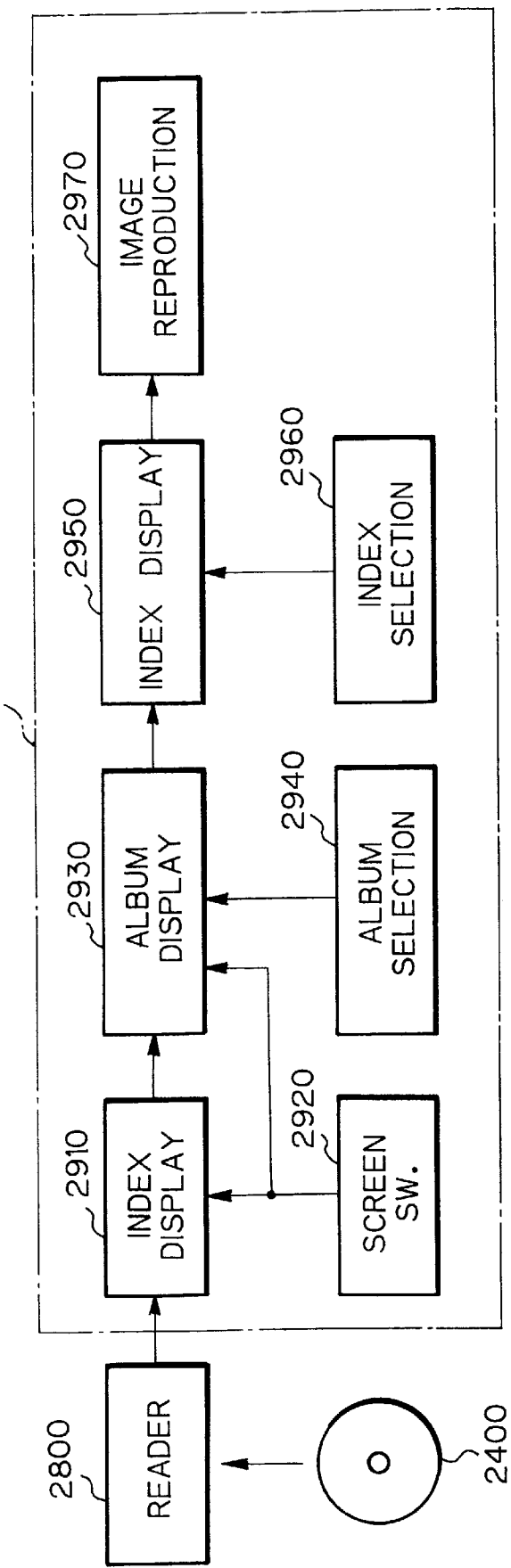
FIG. 29 is also a schematic block diagram showing an illustrative embodiment of a reproducing system adapted to reproduce images recorded in accordance with the image filing system shown in FIG. 28.

On the other hand, a reproducing system for reproducing images from the optical disc 2400 on which images have been recorded through the above-mentioned recording system includes, as shown in FIG. 29, a reader 2800, on which the optical disc 2400 is detachably mounted, and a reproducing processing apparatus 2900 for reproducing images from the contents recorded on and read out from the optical disc 2400. The reader 2800 is an optical reader for sensing the EFM signals from the optical disc 2400 and demodulating the signals into an original form at of signal to supply the signals thus demodulated to the reproducing processing apparatus 2900. Specifically, the reader 2800 detects, when the optical disc 2400 is mounted, the position of the TOC representative of the summarized contents of the disc from the data stored in the lead-in groove area, senses the TOC information to transmit the latter to the reproducing processing apparatus 2900, and thereafter reads out the files in response to an instruction provided from the reproducing processing apparatus 2900 to transmit the filed thus read out to the reproducing processing apparatus 2900.

The reproducing processing apparatus 2900 is similar, as seen from FIG. 29, to the reproducing processing apparatus 1800 shown in FIG. 12, except for that the audio reproducing processing subunit 1860 and the text reproducing processing subunit 1880 are omitted. Thus, in this respect, the redundant description will be omitted.

According to the image filing system as mentioned above, for instance, the image data input apparatus 2100 senses a still picture from a photographic film of silver-halide photosensitive material type or the like to produce imagewise data for each of colors, R, G, B in the form of 8 bits of digital data, which will in turn be supplied to editing apparatus 2200. In the data editing apparatus 2200, the image file generating subunit 2210 compresses the image data, which are sequentially supplied thereto, in accordance with the compression scheme, and generates the image files. In this instance, when a plurality of resolutions of image data are recorded onto the optical disc 2400, they are gathered to form a single image file. The image file thus formed is supplied to the classification subunit 2230. One of the image data thus generated which is minimum in resolution of image is supplied to the reduced-image generating subunit 2220.

Upon receipt of input image data from the image file generating subunit 2210 or the minimum resolution of image data, the reduced-image generating subunit 2220 determines whether or not the image data is of the predetermined size, for example, n×m pixels. When the image data is larger than the predetermined size, the thinning is carried out on the data with an appropriate filtering value selected, so that the image data is reduced into the predetermined size.

The reduced-image data thus obtained is supplied to the classification subunit 2230 and the reduced-image file generating subunit 2250. If it is smaller than the predetermined size, then the predetermined size of frame is added to surround the image area so as to form the predetermined size of reduced-image data. The reduced-image data thus obtained is in turn supplied to the classification subunit 2230 and the reduced-image file generating subunit 2250. If the image data is of the predetermined size, then the image data is utilized as it is. In this manner, the reduced-image data is supplied to the classification subunit 2230 and the reduced-image file generating subunit 2250 in the unified form or size.

After the image file and the reduced image are sequentially created, the name of an album and the like data are inputted for classification from the keyboard or the like. Thus, the classification subunit 2230 forms on the display a species classification of albums 00–*nn* in which reduced images each representative of the associated image file are sequentially registered. The registered information, i.e. the classification information, is supplied to the classified-image generating subunit 2240, the reduced-image file generating subunit 2250, the information file generating subunit 2260 and the directory generating subunit 2270.

Figure 34:
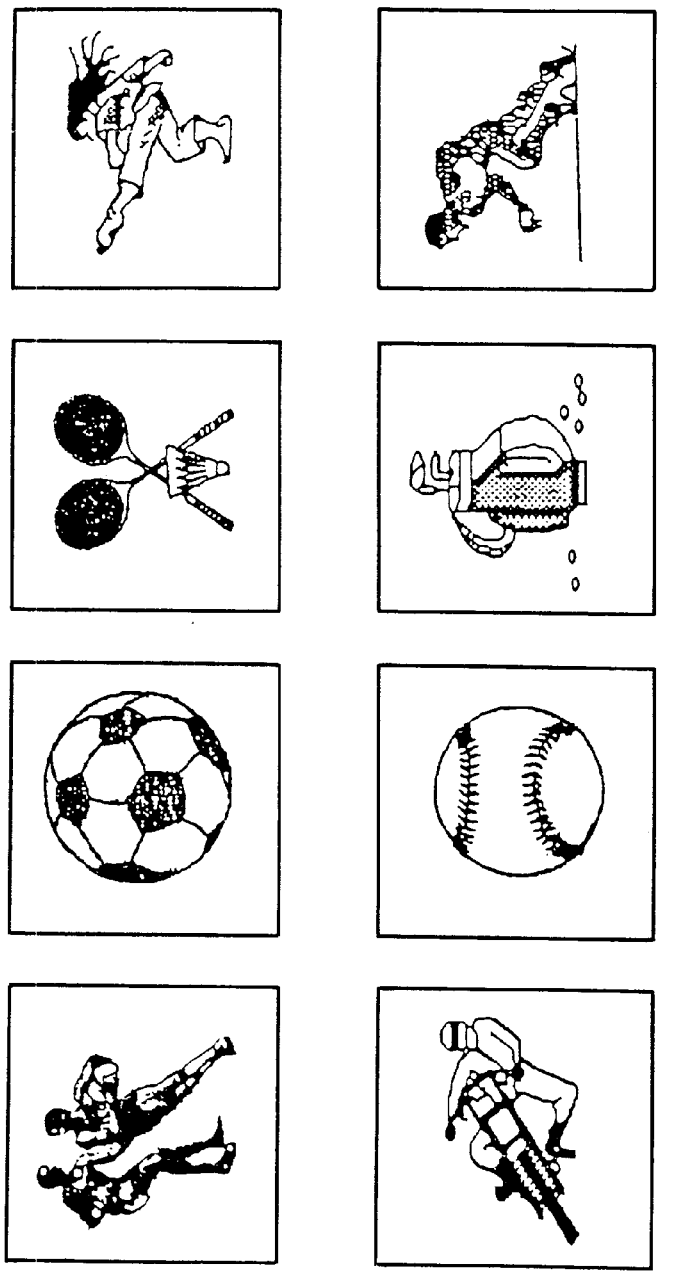
FIG. 34 shows an example of a album selection screen produced in accordance with the image filing system shown in FIG. 28.

Upon receipt of the classification information, the classified-image generating subunit 2240 generates path images each representative of an aspect of the associated one of the albums classified by the classification subunit 2230. For example, the operator optionally selects any one of the classified image data, and modifies the selected one so that the image is reduced into the same size as the reduced-image data. For instance, path images as shown in FIG. 33 are generated for the species classification of albums, and are arranged as shown in FIG. 34 to form the album selection screen.

Upon receiving the classification information, the reduced-image file generating subunit 2250 generates a reduced-image file including a header and an entry field in accordance with the classification information. At that time, the path images to the respective albums are recorded onto the file together with the reduced-image data. Likely, the information file generating subunit 2260 generates an information file including the header, the path to the album path image and the path to the image file. The files generated in these file generating subunits 1250 and 1260 are sequentially supplied to the directory generating subunit 1270.

When receiving the files and the classification information, the directory generating subunit 2270 forms directories on the basis of the received information and sequentially supplies them to the recorder 2300. As a result, the recorder 2300 is operative to reserve recording areas for lead-in groove information, TOC information including directory information, an information file, an image file and a reduced-image file in the optical disc 2400 in the order from the innermost to outermost track thereof, and record them sequentially onto the optical disc 2400 under the EFM modulation system.

Where the image file is reproduced, mounting the optical disc 2400 on the reader 2800 causes, first, the lead-in groove area to be sensed, and the position of a TOC area representative of file contents to be detected. Thus, the directory information included in the TOC area is read out and supplied to the reproducing processing apparatus 2900. Upon receipt of the directory information, the directory display subunit 2910 displays the directory on the display screen. A display switching operation by the operator viewing the screen of the display causes the display switching processing subunit 2920 to send out a switching instruction to the album display subunit 2930. Thus, the album display subunit 2930 drives the reader 2800 to read out the information file of the optical disc 2400 and forms the path images of the albums from the reduced-image files. The album display subunit 2930 will then perform the album display on the display screen, as shown in FIG. 34.

A selection of a desired album by an operator watching the album display on the display screen causes the album selection subunit 2940 to send out the selection instruction. Thus, the index display subunit 2960 reads out reduced-image data of the associated album in the information files by retrieving the reduced-image file, and performs the index display including a plurality of reduced images on the display. The operator may select a desired reduced image shown on the display screen to reproduce a desired image file. As a result, the index selection subunit 2960 sends out a selection command signal to the image reproducing unit 2970, FIG. 29, to read out the image files from the optical disc 2400, thereby reproducing the desired image files.

If a desired image is not presented on the screen, the operator may scroll the index screen to retrieve the desired image. If the desired image is not involved in the album, he or she may return to the the album screen to select another album, and repeat and the above-mentioned operation so as to reach the desired image.

According to the embodiment of the method of recording an image file and the image filing system of the present invention, a larger amount of images can be managed on the basis of smaller handling unit. It is thus possible to arrange images in a simpler way. Specifically, since the files including the image files are managed album by album, it is sufficient, when an image is to be added for instance, to simply register that image to be added into a desired album. In this case, according to the present embodiment, the path image representative of an aspect of the classified album is generated and displayed on the screen. Thus, the operator can visually recognize the aspects of the classification recorded on the optical disc, whereby it is possible to manage images to be registered in a fashion similar to that of the album for conventional photograph. In the case of reproducing images, it is possible to readily reproduce a desired image by selecting a desired album and then an index representative of the desired image in the selected album. In this case, for instance, when image data are recorded onto the optical discs over 500 sheets and classified into, for example, three or more albums, with an index picture frame containing 32 small pictures, for example, the operator can reach his desired image by scrolling index pictures eight times at most. Thus, for displaying the index images, use can be made for a memory of storage capacity as small as eight fields of image data. Therefore, there is an advantage such that the cost of the apparatus is reduced.

Figure 36:
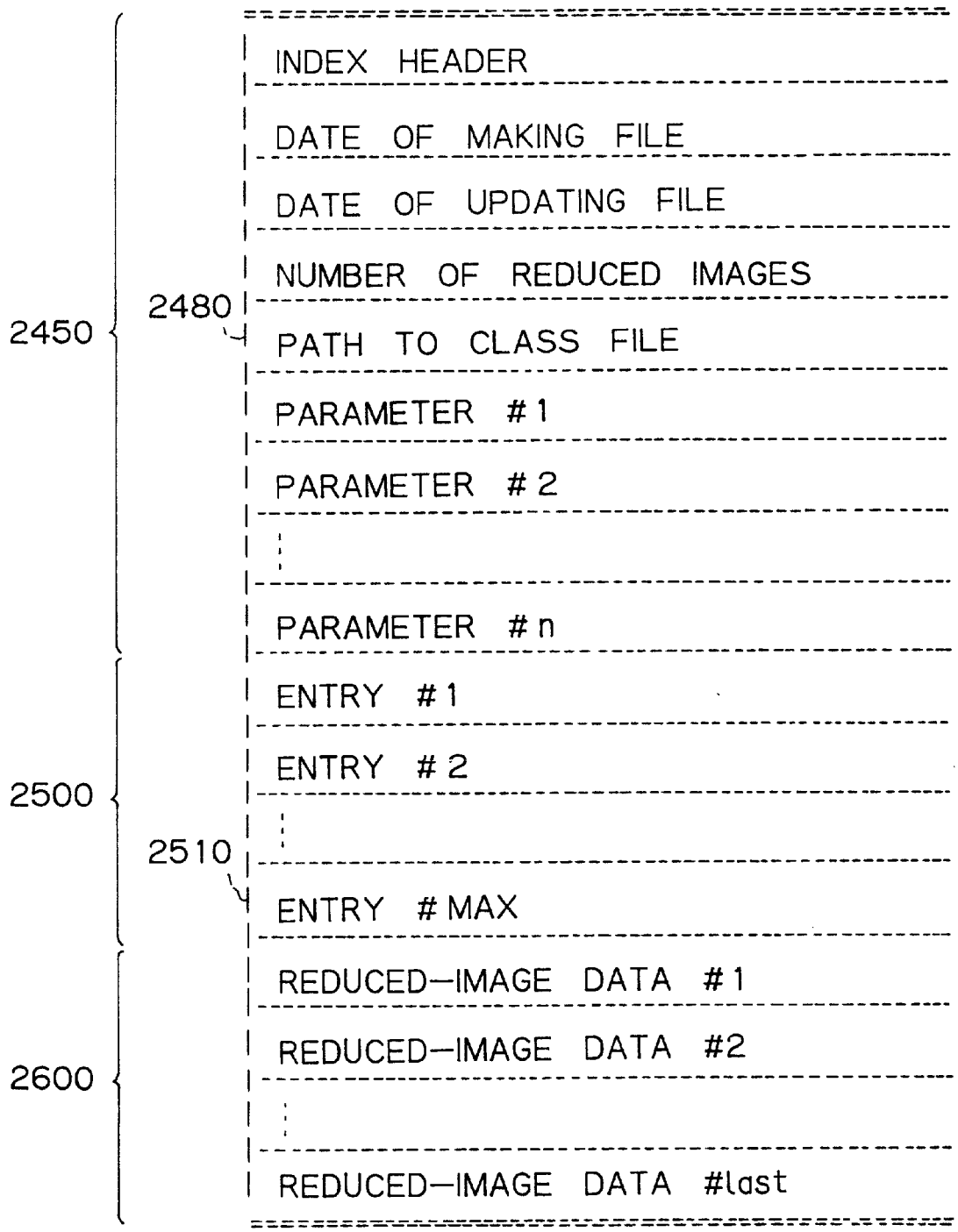
FIG. 36 shows another example of the reduced-image file produced in accordance with the image filing system shown in FIG. 28.

According to the present embodiment, the system is arranged to generate and register reduced-image data corresponding to what are inputted into the reduced-image file. The system may, however, be adapted to reserve in advance, as denoted with reference numeral 2510, FIG. 36, areas corresponding to the number of images registrable in the album, and thereafter register the registered reduced-image data sequentially into the reserved areas.

Further, according to the present embodiment, the system is arranged to provide a path from the classification file to the reduced-image file. However, the system may also be arranged to provide, as denoted by reference numeral 2480, FIG. 36, paths each from one of the reduced-image files to the associated classification file.

Still further, according to the present embodiment, the system is arranged to individually create and record the classification file and the reduced-image file. The system may also be adapted to register, as shown in FIG. 37, the reduced-image data in the classification files, which are used on a common basis.

Furthermore, according to the present embodiment, the system is arranged to form the image file in the JPEG type of format. However, the image file may be formed in another type of format, such as the TIFF. In this case, it is acceptable that classification codes are each applied to a header of the associated tag so as to establish a hierarchical structure. Still furthermore, according to the present embodiment, the system is arranged to modify any one of the images read in to generate a path image. However, the system may be adapted to provide a hybrid disc having a volume including a path image of a pre-determined sub-directory recorded.

According to the present embodiment, as a file recording medium onto which the image files are recorded, a write-once compact disc is effectively applied. However, the present invention is not restricted to this kind of recording medium. It is possible to adopt any type of file recording medium, for example, a rewritable optical disc, i.e. a so-called minidisc, a CD-ROM which can be manufactured by a stamper or the like, an optical recording medium such as a large-storage capacity of magneto-optical disc, a semi-conductor recording medium such as an IC memory card, and a magnetic recording medium such as a magnetic recording tape. Further, the illustrative embodiment described above is adapted to record imagewise data onto the recording medium. However, the present invention is also effectively applicable to such an application that a lot of audio data are recorded. In the latter application, index data may be generated, for example, with a sampling frequency of the audio signals lowered, or the number of bits reduced.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A digital image file having a predetermined format comprising:
   a first storage area including a plurality of data fields for storing compressed image data associated with a plurality of image blocks, each image block representative of a divided field of image area of an image frame, said compressed image data being stored in accordance with image block identifications corresponding to each image block, said plurality of image blocks including image blocks designated as most significant image blocks by a designating unit and image blocks not designated as most significant image blocks; and
   a second storage area including a data field, separate from said first storage area, for storing a plurality of image block identifications corresponding only to image blocks designated as most significant image blocks,
   said second storage area being accessible to enable access from said first storage area of only compressed image data associated with image blocks designated as most significant image blocks without accessing compressed image data associated with image blocks not designated as most significant image blocks.

2. A digital image method comprising the step of:

reproducing only the most significant portion of an image frame from an image file associated with the image frame stored in a file memory, said image file having a predetermined format including, a first storage area including a plurality of data fields for storing compressed image data associated with a plurality of image blocks, each image block being representative of a divided field of image area of the image frame, said compressed image data being stored in accordance with image block identifications corresponding to each image block, said plurality of image blocks including image blocks designated as most significant image blocks by a designating unit and image blocks not designated as most significant image blocks, a second storage area including a data field, separate from said first storage area, for storing a plurality of image block identifications corresponding only to image blocks designated as most significant image blocks, said second storage area being accessible to enable access from said first storage area of only compressed image data associated with image blocks designated as most significant image blocks without accessing compressed image data associated with image blocks not designated as most significant image blocks.

3. A digital image apparatus comprising:

a reproducing unit for reproducing only the most significant portion of an image frame from an image file associated with the image frame stored in a file memory, said image file having a predetermined format including, a first storage area including a plurality of data fields for storing compressed image data associated with a plurality of image blocks, each image block representative of a divided field of image area of the image frame, said compressed image data being stored in accordance with image block identifications corresponding to each image block, said plurality of image blocks including first image blocks designated as most significant image blocks by a designating unit and image blocks not designated as most significant image blocks, a second storage area including a data field, separate from said first storage area, for storing a plurality of image block identifications corresponding only to image blocks designated as most significant image blocks, said second storage area being accessible to enable access from said first storage area of only compressed image data associated with image blocks designated as most significant image blocks without accessing compressed image data associated with image blocks not designated as most significant image blocks.

4. A digital image apparatus comprising:

an image signal input unit for receiving an image signal representative of an image frame and dividing a field of image area formed by the image signal into a plurality of image blocks;

a block identification generating unit for generating a corresponding image block identification associated with each of the plurality of image blocks;

a designating unit for designating desired ones of said plurality of image blocks as most significant image blocks; and a file memory for storing an image file associated with the image frame, said image file including, a first storage area for storing each image block according to its corresponding image block identification, a second storage area, separate from said first storage area, for storing only image block identifications corresponding to the most significant image blocks, said second storage area being accessible to enable access from said first storage area of only image blocks designated as most significant image blocks without accessing image blocks not designated as most significant image blocks.

5. The aparatus of claim 4, further comprising:

a reproducing unit for reading the image file stored in said file memory and producing an image represented by the most significant image blocks.

6. The apparatus of claim 5, wherein said reproducing unit includes a decoder for expanding the image signals read out from said first storage area.

7. The apparatus of claim 5, wherein said reproducing unit includes a generator for generating lattice patterns each corresponding to an associated one of the plurality of blocks, and wherein the generated lattice patterns are superposed upon the image represented by the image signal read out from said storage unit.

8. The apparatus of claim 4, wherein the image block identifications stored in the second storage area are variably set up, and said apparatus includes a setting-up circuit for manually setting up the image block identifications.

9. The apparatus of claim 4, wherein the image block identifications stored in the second area are fixedly set up.

10. The apparatus of claim 4, further comprising a compressing unit for compressing the image signal block by block, wherein said first storage area stores image signals of the plurality of blocks in a compressed form.

11. A digital image method comprising the steps of:

receiving an image signal representative of an image frame and dividing a field of image area formed by the image signal into a plurality of image blocks;

generating a corresponding image block identification associated with each of the plurality of image blocks;

designating desired ones of said plurality of image blocks as most significant image blocks; and storing an image file associated with the image frame, said image file including, a first storage area for storing each image block according to its corresponding image block identification, a second storage area, separate from said first storage area, for storing only image block identifications corresponding to the most significant image blocks, said second storage area being accessible to enable access from said first storage area of only image blocks designated as most significant image blocks without accessing image blocks not designated as most significant image blocks.

12. The method of claim 11, further comprising the steps of:

reading the image file and producing on a display unit an image represented by the most significant image blocks.

13. A digital image method comprising the steps of:

generating from pieces of information including image data, a data file including, a first storage area for storing a plurality of image blocks representative of a divided field of image area of an image frame, said plurality of image blocks including image blocks designated as most significant image blocks by a designating unit and image blocks not designated as most significant image blocks, and a second storage area, separate from said first storage area, for storing a plurality of image block identifications corresponding only to image blocks designated as most significant image blocks, said second storage area being accessible to enable access from said first storage area of only image blocks designated as most significant image blocks without accessing image blocks not designated as most significant image blocks;

classifying the data files generated in said generating step into a plurality of types;

forming sub-directories for registering the data files classified in said classifying step;

generating reduced-image files each representative of a data file for each classification, including path images for each of the sub-directories formed in said sub-directories forming step; and generating control information including paths from a main directory to each of the sub-directories and additional paths from each of the sub-directories through the reduced-image files to the data files.

14. The method of claim 13, wherein the control information is represented by directory information presenting a hierarchical directory structure among the main directory, the sub-directories and the data files.

15. The method of claim 13, wherein the control information is represented by an information file defining paths to the data files.

16. The method of claim 13, wherein the image data is representative of a still picture, and is stored in said first storage area as compressed data.

17. The method of claim 13, wherein the image data includes binary data, which is formed into a type of data file that is transmittable and receivable over a communication line.

18. The method of claim 13, wherein the pieces of information include audio information, and the audio information is arranged into a type of data file that is reproducible together with the image information.

19. The method of claim 13, wherein the pieces of information include text information, and the text information is arranged into a type of data file that is reproducible together with the image information.

20. A digital image apparatus comprising:

a data input unit for inputting pieces of information including image information as digital data of respective formats;

a data file generating unit for generating from each of the pieces of information entered through said data input unit a data file of predetermined format, said data file including, a first storage area for storing a plurality of image blocks representative of a divided field of image area of an image frame, said plurality of image blocks including image blocks designated as most significant image blocks by a designating unit and image blocks not designated as most significant image blocks, and a second storage area, separate from said first storage area, for storing a plurality of image block identifications corresponding only to image blocks designated as most significant image blocks, said second storage area being accessible to enable access from said first storage area of only image blocks designated as most significant image blocks without accessing image blocks not designated as most significant image blocks;

a classifying unit for classifying the data files generated in said data file generating unit into a plurality of types;

a directory forming unit for forming sub-directories each including the associated data file classified by said classifying unit and registering the sub-directories in a main directory as a tree;

a reduced-image file generating unit for generating reduced-image files, each representative of a data file to be registered in the associated sub-directory, for each of the sub-directories formed in said directory forming unit;

a control information generating unit for generating control information including paths from the main directory to the sub-directories and additional paths from the sub-directories through the reduced-image files to the data files; and a recording unit for recording the data files and the information thus generated onto a recording medium.

21. The apparatus of claim 20, wherein the recording medium is a rewritable, optical recording medium.

22. The apparatus of claim 20, wherein the recording medium is a magnetic recording tape.

23. The apparatus of claim 20, wherein the recording medium is a rewritable, write-once optical disc.

24. A digital image method comprising the steps of:

generating, from entered image data, an image file of predetermined format, said image file including, a first storage area for storing a plurality of image blocks representative of a divided field of image area of an image frame, said plurality of image blocks including image blocks designated as most significant image blocks by a designating unit and image blocks not designated as most significant image blocks, and a second storage area, separate from said first storage area, for storing a plurality of image block identifications corresponding only to image blocks designated as most significant image blocks, said second storage area being accessible to enable access from said first storage area of only image blocks designated as most significant image blocks without accessing image blocks not designated as most significant image blocks;

generating, from the entered image data, a predetermined size of reduced-image data without any resolution conversion by appending identification information to the entered image data;

classifying the image files generated in said image file generating step into a plurality of types;

forming sub-directories including the image files classified in said classifying step;

generating path images, each representative of an aspect of classification for each of the sub-directories formed in said sub-directories forming step; and generating from the reduced-image data generated in said reduced-image data generating step reduced image files of predetermined formats for each of the sub-directories formed in said sub-directories forming step.

25. The method of claim 24, wherein each reduced-image file has a storage capacity of reduced-image data corresponding to images registrable in the sub-directory.

26. The method of claim 24, wherein said reduced-image file generating step reserves beforehand in the reduced-image file an area in which reduced-image data can be stored corresponding to images registrable in the sub-directory.

27. The method of claim 24, further comprising a step of generating classification files for each of the sub-directories.

28. The method of claim 27, wherein the classification file includes the reduced-image file and the reduced-image data.

29. The method of claim 24, wherein said reduced-image data generating step includes:
   a substep of reducing the entered image data at a predetermined rate; and
   a substep of determining whether or not the reduced image data generated in said image data reducing step is of a prescribed size, and reducing further, when a size of the reduced image data is larger than the prescribed size, the reduced image data reduced in the reducing substep, and adding, when the size of the reduced image data is smaller than the prescribed size, a prescribed size of frame to the reduced image data.

30. The method of claim 29, wherein said image file generating step generates a plurality of resolutions of image data from the entered image data and provides the image data in the form of a single image file, and said reduced-image file generating step generates the reduced-image file by utilizing a resolution of image data which is smallest among the plurality of resolutions of image data generated in said image file generating step.

31. A digital image apparatus comprising:
   an image file generating unit for generating, from entered image data, an image file of predetermined format said image file including,
      a first storage area for storing a plurality of image blocks representative of a divided field of image area of an image frame, said plurality of image blocks including image blocks designated as most significant image blocks by a designating unit and image blocks not designated as most significant image blocks, and
      a second storage area, separate from said first storage area, for storing a plurality of image block identifications corresponding only to image blocks designated as most significant image blocks,
      said second storage area being accessible to enable access from said first storage area of only image blocks designated as most significant image blocks without accessing image blocks not designated as most significant image blocks;
   a reduced-image data generating unit for generating, from the entered image data, a predetermined size of reduced-image data;
   a classifying unit for classifying the image files generated in said image file generating unit into a plurality of types;
   a directory forming unit for forming unit for sub-directories including the respective image files classified in said classifying unit;
   a path image generating unit for generating path images, each representative of an aspect of classification for each of the sub-directories formed in said directory forming unit;
   a reduced-image data generating unit for generating reduced-image data generated in said reduced-image data generating unit as reduced-image files of predetermined formats for each of the sub-directories generated in said directory forming unit; and
   a recording unit for recording the files and the information thus generated onto a recording medium.

32. The data filing system of claim 31, wherein the recording medium is a rewritable, optical recording medium.

33. The apparatus of claim 31, wherein the recording medium is a magnetic recording tape.

34. The apparatus of claim 31, wherein the recording medium is a rewritable, write-once optical disc.

* * * * *